United States Patent
Van Damme et al.

(10) Patent No.: US 12,261,720 B2
(45) Date of Patent: Mar. 25, 2025

(54) APPARATUS AND METHOD FOR CHANNEL FREQUENCY RESPONSE ESTIMATION

(71) Applicant: Nokia Solutions and Networks Oy, Espoo (FI)

(72) Inventors: Axel Van Damme, Loyers (BE); Nicolas Dupuis, Chaudfontaine (BE); Philippe Dierickx, Saint-Gery (BE); Olivier Delaby, Loyers (BE)

(73) Assignee: Nokia Solutions and Networks Oy, Espoo (FI)

( * ) Notice: Subject to any disclaimer, the term of this patent is extended or adjusted under 35 U.S.C. 154(b) by 166 days.

(21) Appl. No.: 18/300,539

(22) Filed: Apr. 14, 2023

(65) Prior Publication Data

US 2023/0344679 A1    Oct. 26, 2023

(30) Foreign Application Priority Data

Apr. 20, 2022  (EP) .................................... 22169117

(51) Int. Cl.
    *H04L 25/02*    (2006.01)

(52) U.S. Cl.
    CPC ........ *H04L 25/022* (2013.01); *H04L 25/0254* (2013.01)

(58) Field of Classification Search
    CPC ........... H04L 25/022; H04L 25/0254
    See application file for complete search history.

(56) References Cited

U.S. PATENT DOCUMENTS

| | | | |
|---|---|---|---|
| 2020/0243102 A1 | 7/2020 | Schmidt et al. | |
| 2020/0343985 A1* | 10/2020 | O'Shea | G06N 3/045 |
| 2021/0166705 A1 | 6/2021 | Chang et al. | |
| 2021/0366495 A1 | 11/2021 | Kleijn et al. | |
| 2022/0383118 A1* | 12/2022 | Nair | G06N 3/0455 |

OTHER PUBLICATIONS

Sen Li, "Speech Bandwidth Extension Using Generative Adversial Networks," IEEE, 2018, pp. 5029-5033.
Jiaqi Su et al., "Bandwidth Extension Is All You Need," IEEE, 2021, pp. 696-700.

* cited by examiner

*Primary Examiner* — Vineeta S Panwalkar
(74) *Attorney, Agent, or Firm* — Harness, Dickey & Pierce, P.L.C.

(57) ABSTRACT

In one embodiment, the method includes obtaining channel response data including a first channel frequency response of a channel over a first frequency spectrum, where the first channel frequency response is generated in response to a transmission over the channel or a simulation thereof; and generating an estimate of a second channel frequency response of the channel over a second frequency spectrum in response to applying the channel response data to a machine-learning model, where the second frequency spectrum is different to the first frequency spectrum.

14 Claims, 15 Drawing Sheets

APPARATUS AND METHOD FOR CHANNEL FREQUENCY RESPONSE ESTIMATION

CROSS-REFERENCE TO RELATED APPLICATIONS

This application claims priority to and the benefit of European Patent Application No. 22169117.3 filed on Apr. 20, 2022, the entire contents of each of which are incorporated herein by reference.

FIELD

The specification relates to channel frequency response estimation for a channel and, in particular, estimating a second channel frequency response from a first channel frequency response of the same channel covering a different frequency spectrum.

BACKGROUND

Conventional techniques for channel frequency response estimation for determining performance of new communications technology over existing communication channels prior to deployment typically require a significant upfront investment in resources for testing and performance measurements. However, there remains a need for further developments in this field.

SUMMARY

In a first aspect, this specification describes an apparatus comprising means for performing: obtaining channel response data comprising a first channel frequency response of a channel over a first frequency spectrum, wherein the first channel frequency response is generated in response to a transmission over the channel or a simulation thereof; and generating an estimate of a second channel frequency response of the channel over a second frequency spectrum in response to applying the channel response data to a machine-learning (ML) model, wherein the second frequency spectrum is different to the first frequency spectrum.

The first frequency spectrum has a frequency range between a first and a second frequency, and the second frequency spectrum has a frequency range between a third and a fourth frequency, the fourth frequency being greater than the second frequency.

In some example embodiments, the first channel response is a narrowband channel response of a narrowband transmission, the second channel response estimate is a wideband channel response.

The channel is a communications medium comprising a wired communications medium or, a wireless communications medium, or a combination of both.

In some example embodiments, the ML model comprises any ML model from the group of: neural network; transformer-based ML model; encoder-decoder ML model; any other ML model capable of being trained to predict a second channel frequency response over a second frequency spectrum in response to applying a first channel frequency response over a first frequency spectrum.

In some example embodiments, the ML model is an encoder-decoder ML model, the apparatus further comprising means for performing: extracting a channel response feature set in response to applying the channel response data to an encoder of the encoder-decoder ML model; and generating the estimate of the second channel frequency response of the channel over the second frequency spectrum in response to applying the extracted channel response feature set to a decoder of the encoder-decoder ML model.

In some example embodiments, the encoder of the encoder-decoder ML model comprises a convolutional encoder and the decoder comprises a convolutional decoder, the convolutional encoder further comprising a neural network of one or more convolution layers, one or more pooling layers, and one or more fully-connected layers configured for extracting the channel response feature set, and the convolutional decoder further comprising a neural network of one of more deconvolution layers configured for receiving and transforming data representative of the extracted channel response feature set into an estimated second channel response of the channel over the second frequency spectrum.

In some example embodiments, the apparatus further comprising means for performing: training of the ML model based on: obtaining training data instances, each training data instance comprising data representative of a channel response and data representative of a target channel response; applying a training data instance to the ML model; estimating a loss based on a difference between the estimated second channel frequency response output by the ML model and the target channel frequency response of each training data instance; and updating a set of weights ML model based on the estimated loss.

Each training instance may comprise at least one from the group of: channel response data generated in response to a transmission over an example channel or a simulation thereof, and target channel response data generated in response to a target transmission over the example channel or simulation thereof; or channel response data generated in response to a transmission over an example channel or a simulation thereof, target channel response data generated in response to a target transmission over the example channel or simulation thereof, and an indication of the target frequency range or spectrum.

In some example embodiments, a batch of samples of training instance data is applied to the ML model, and the means for performing estimating said loss is further configured for: performing a regression analysis on said estimated second channel frequency responses output samples and corresponding target channel responses is said batch of samples; stationarising the estimated second channel frequency responses and corresponding target channel response samples of the batch of samples to seek to set each sample in the batch to the same mean; performing a principal component analysis and whitening process on said stationarised estimated second channel frequency response and corresponding target channel response samples of the batch of samples; and estimating the loss based on a weighted combination of the output of the principal component analysis and whitening process and regression analysis.

In some example embodiments, the apparatus further comprising means for processing the estimated second channel response based on performing one or more from the group of: predicting, based on the estimated second channel response, a channel capacity of the channel prior to deployment of communications technologies expected to use said second frequency spectrum on said channel; estimating, based on the estimated second channel response, Signal-to-Noise ratio (SNR) for operating frequencies of said second frequency associated with communication technologies expected to operate said channel over said second frequency spectrum; and predicting a set of configuration parameters, based on said estimated second channel response, for provisioning a communication link to maximise a quality of service value when deployed to use said channel over said estimated second frequency spectrum.

In some example embodiments, the apparatus further comprising means for processing the first channel response for estimating the second channel response at a reduced loop length based on: determining a loop length scale factor based on measuring or simulating multiple channel responses at different loop lengths in relation to the channel and estimating the slopes of each of the multiple channel responses; estimating a first channel response at the reduced loop length based on proportionally scaling the first channel response in relation to the loop length scale factor and the target length of the loop; and applying the estimated first channel response at the reduced loop length to the ML model for outputting a second channel response at the reduced loop length over the second frequency spectrum.

In some example embodiments, the apparatus wherein the means comprise: at least one processor; and at least one memory including computer program code, the at least one memory and computer program code configured to, with the at least one processor, cause the performance of the apparatus.

In a second aspect, this specification describes a method comprising: obtaining channel response data comprising a first channel frequency response of a channel over a first frequency spectrum, wherein the first channel frequency response is generated in response to a transmission over the channel or a simulation thereof; and generating an estimate of a second channel frequency response of the channel over a second frequency spectrum in response to applying the channel response data to an ML model, wherein the second frequency spectrum is different to the first frequency spectrum.

In a third aspect, this specification describes a computer program comprising instructions for causing an apparatus to perform at least the following: obtaining channel response data comprising a first channel frequency response of a channel over a first frequency spectrum, wherein the first channel frequency response is generated in response to a transmission over the channel or a simulation thereof; and generating an estimate of a second channel frequency response of the channel over a second frequency spectrum in response to applying the channel response data to an ML model, wherein the second frequency spectrum is different to the first frequency spectrum.

In a fourth aspect, this specification describes computer-readable instructions which, when executed by a computing apparatus, cause the computing apparatus to perform (at least) any method as described with reference to the second aspect.

In a fifth aspect, this specification describes a computer-readable medium (such as a non-transitory computer-readable medium) comprising program instructions stored thereon for performing (at least) any method as described with reference to the second aspect.

In a sixth aspect, this specification describes an apparatus comprising: at least one processor; and at least one memory including computer program code which, when executed by the at least one processor, causes the apparatus to perform (at least) any method as described with reference to the second aspect.

In another aspect the specification relates to embodiments of a non-transitory computer readable medium comprising program instructions stored thereon for performing at least the following: obtaining channel response data comprising a first channel frequency response of a channel over a first frequency spectrum, wherein the first channel frequency response is generated in response to a transmission over the channel or a simulation thereof; and generating an estimate of a second channel frequency response of the channel over a second frequency spectrum in response to applying the channel response data to a ML model, wherein the second frequency spectrum is different to the first frequency spectrum.

BRIEF DESCRIPTION OF DRAWINGS

Example embodiments will now be described, by way of non-limiting examples, with reference to the following schematic drawings, in which.

DETAILED DESCRIPTION

Figure 1:
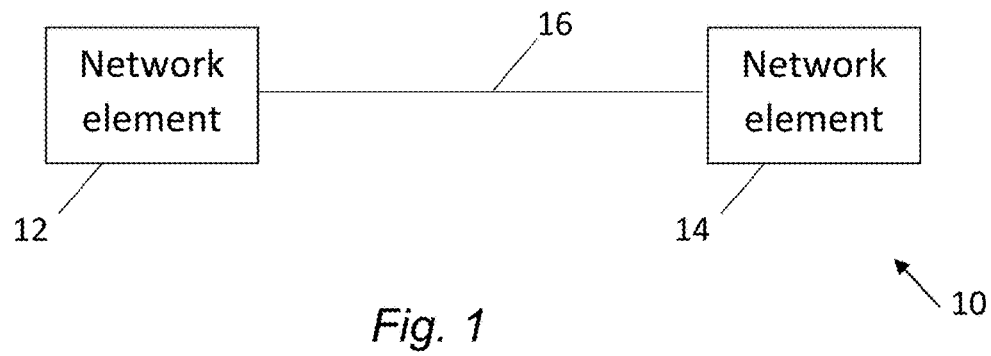
FIG. 1 is a block diagram of an example system.

The scope of protection sought for various embodiments of the invention is set out by the claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of an example system, indicated generally by the reference numeral 10. The system comprises a first network element 12 and a second network element 14 connected by a communication link 16. The communication link 16 comprises a communication channel over which transmission signals are transmitted between the first and second network elements 12 and 14.

The network elements 12 and 14 may be part of access nodes and/or of customer end user equipment of a communication system and may, for example, be located at customer premises and/or a network operator's premises (e.g. with one node being at a network operator and the other at customer premises). The communication link 16 may be a cable, such as a twisted pair of copper wires, but may take many other forms, such as an optical fibre cable or a wireless connection. Moreover, the communication link may comprise a combination of technologies, such as copper cable sections, fibre optic sections, and/or wireless sections.

In one example embodiment, the communication link 16 is a digital subscriber line (DSL) but may take other forms, such as links of a smart grid (e.g. electrical cables over which communication can take place), wireless solutions, optical fibre cables, Ethernet cables, powered line communication (PLC), and/or combinations thereof and the like. The skilled person will be aware of other communication links that could make use of the principles described herein.

Specifically in such communication networks, with the increasing bitrate offers such as, for example, the deployment of Internet Protocol television (IPTV) solutions, Video-On-Demand and Triple-play services etc., the system performance for communication systems, such as the system 10, are becoming increasingly important. The physical link, which transports the information through, for example, the wire lines up to the end user, is a known bottleneck for Quality of Service (QoS). Hence, it can be useful to be able to remotely diagnose sources of physical problems and take actions to improve performance.

Moreover, recent technology evolutions tend to push the signal bandwidth of current communication links, such as DSL lines or wireless communications, higher. For example, in the recent past, traditional ADSL technology used frequencies up to 1.1 MHz, Very-high rate DSL (VDSL2) technology can be applied up to 17 MHz or even 35 MHz. The extensive use of those higher frequencies as well as solutions to increase performance can make an existing communication link 16 more sensitive to disturbances. This is particularly so for upcoming DSL communication technologies and standards such as, for example, G.fast and G.mgfast communications technologies that may use bandwidths up to 106 MHz (or 212 MHz) and 424 MHz (or even 848 MHz), respectively.

Offering solutions to correctly provision, configure, deploy and troubleshoot existing and/or new communication links 16 offers many advantages. This is especially so for considering and/or qualifying the communication link 16.

Figure 2:
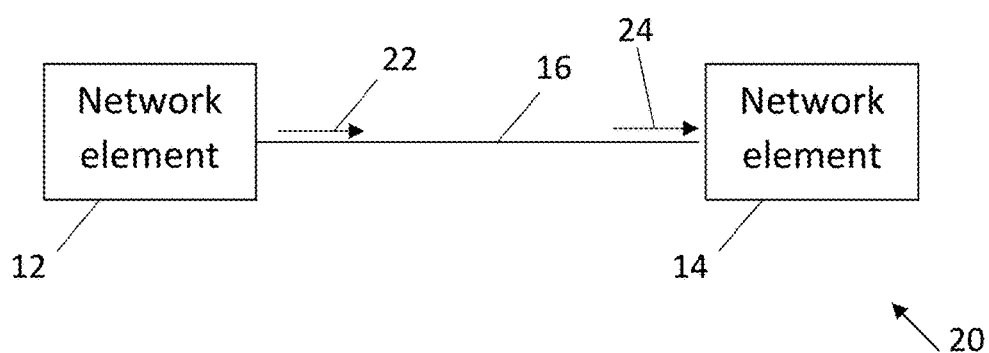
FIG. 2 shows an example channel frequency response measurement in the example system.

FIG. 2 is a block diagram of a system, indicated generally by the reference numeral 20, in accordance with an example embodiment. The system 20 comprises the first network element 12, the second network element 14 and the communication link 16 of the system m described above. The network elements 12 and 14 may be configured for communicating over the communication link 16 based on, without limitation, for example DSL technology.

The channel frequency response of the channel of communication link 16 is one of the performance metrics that may be used to analyse the performance of the communication link 16. The channel frequency response of the channel of communication link 16 may be measured by transmitting a transmission signal 22 from network element 12 over communication link 16 and measuring a received signal 24 associated with the transmitted transmission signal 22 at network element 14. This may be used to derive the channel frequency response of the channel of communication link 16, which comprises the attenuation of the channel (or communication medium) of communication link 16 over a frequency bandwidth of interest. For example, DELT (Dual-Ending Line Testing) may be performed using data obtained while network elements 12 and 14 (e.g. modems) at each end of communication link 16 are operating, which permits measurement of the channel frequency response, commonly called Hlog when expressed in decibels. The amplitude of the channel frequency response, also referred to herein as Hlog when expressed in decibels, is a key metric for many communication systems and can, for example, be used to define the signal-to-noise ratio (SNR) of a link. The channel frequency response may be displayed along with the transmitted power spectral density (PSD) of the transmission signal 22, the received PSD of the received signal 24 and noise PSD and the like.

The network elements 12 and/or 14 may be transceiver units (transmitter/receivers) such as, for example, modems that connect with each other over the channel of the communication link 16. Operational data that may be measured during transceiver unit operation may include, without limitation, for example the channel frequency response (Hlog), the Quiet/Active Line Noise (QLN/ALN), transmitted Power Spectral Density (TxPSD), noise PSD, SNR and the like. These are required in order to establish and maintain communications to a certain level of performance. In essence, this requires having transceiver units 12 and 14 connected to the channel medium of communication link 16 at both ends and for operating within the frequency spectrum of the transceiver unit under service.

However, for new transceiver or communication technologies operating over a different frequency spectrum as current transceiver units 12 and/or 14, it is difficult to assess whether the channel of the communication link 16 may support the new technology with the required level of performance. Knowing what type of performance may be provided over existing communications links should such new technologies be deployed is key to the successful deployment of these technologies. There is a desire for a system capable of extrapolating/predicting/synthesizing or estimating the expected channel frequency response (Hlog), Quiet/Active Line Noise (QLN/ALN) and other performance metrics for existing channels prior to deployment of these future communication technologies over such channels.

Moreover, besides the strategic network decisions, there is a direct relationship between the delivered QoS, the physics (state of the medium, noise environment measured through the different operational data such as the Channel Frequency Response (Hlog)) and the applied configuration (comprising values of the parameters embedded in the communication link or line profile). The communication link or line profile for a particular communication technology/devices (e.g. DSL, G.fast, G.mgfast technologies/devices or modems etc.) comprises configuration settings and/or parameters for operating said communication transmission technology/devices over the communication link whilst meeting one or more required operating and/or communication performance characteristics. For example, the communication link (or line) configuration settings and/or parameters of the communication link profile (or line profile) for a particular communication technology/device may include, without limitation, for example the maximum bitrate, the maximum/minimum power, noise margin, retransmission delay, and/or any other operating performance characteristics such as Quality of Service (QoS) that are required to be met when operating said communication technology over the communication link. The communication link profile (or line profile) takes into account the channel conditions (line conditions) (e.g. channel noise) and should be selected to provide the highest bitrate whilst maintaining a high or acceptable QoS when communicating over the communication link. The resulting communication link profile (or line profile) for a particular communication technology typically results in a trade-off between the performance of the communication link (e.g. high bitrate, low error rate) and QoS (e.g. protection against perturbations, latency, throughput, etc.) In other words, depending on the physics of the communication link (or line), a communication profile for each communication technology (e.g. (v)DSL, G.fast, G.mgfast technologies) with an appropriate configuration set needs to be applied, which is usually different from the default one when operating new communication technologies in order to still operate with good Quality of Service (QoS) and/or met the communication performance requirements of said new communication technologies. Such optimal configuration provisioning in wider-spectrum communications technology could therefore be performed prior to enablement according to the predicted channel of the communication link as described herein.

Figure 3:
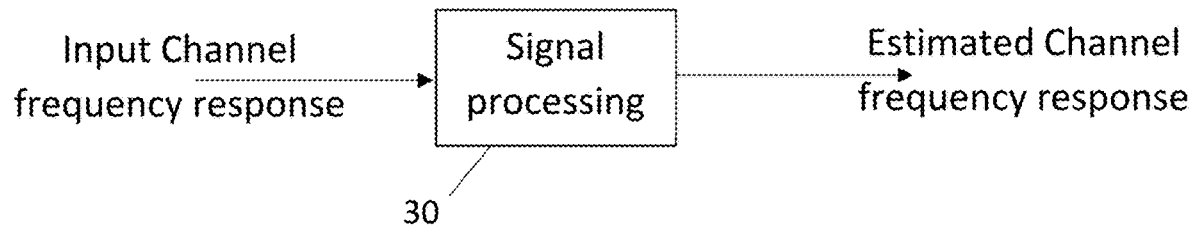
FIG. 3 is a block diagram of a signal processing module in accordance with an example embodiment.

FIG. 3 is a block diagram of an apparatus 30 comprising a processor/memory forming together in an embodiment a signal processing module, in accordance with an example embodiment. This apparatus receives at one or more inputs an input channel frequency response over a first frequency spectrum in response to a transmission of a transmission signal 22 over the channel of communication link 16 or in response to a simulation of the channel of communication link 16. The apparatus 30 is configured to generate an estimate of a channel frequency response (Hlog) over a second frequency spectrum different to the first frequency spectrum at one or more outputs.

The apparatus 30 may further be configured for processing the estimated second channel response to determine one or more performance metrics of the channel and/or configuration parameters for deploying and using the new communication technologies on the channel of communication link 16 over the second frequency spectrum. For example, the processing may comprise, without limitation, for example performing one or more from the group of: predicting, based on the estimated second channel frequency response, a channel capacity of the channel prior to deployment of the new communications technologies expected to use said second frequency spectrum over said channel; estimating, based on the estimated second channel frequency response, performance metrics such as, without limitation, for example Signal-to-Noise (SNR) ratio for operating frequencies of said second frequency associated with the new communication technologies expected to operate on and use said channel over said second frequency spectrum; and/or predicting a set of configuration parameters, based on said estimated second channel response, for provisioning the communication link 16 to maximise a quality of service value and/or data rate for users using said channel over said estimated second frequency spectrum.

The prediction of the estimated second channel frequency response may be used for determining line status and troubleshooting of the communication link 16. For example, the estimated second channel frequency response may be processed and used to accurately predict the bitrate capacity that a medium/channel of communication link should be able to sustain once the line has been migrated to wider-spectrum technology. This also makes it feasible, prior to the deployment of the wider-spectrum technology and/or transceiver/modem connection/switch/upgrade, to precisely estimate the SNR for the operating frequencies of the wide-spectrum technology. These performance metric predictions may be used by service providers in network planning, operation & maintenance.

In addition, software-defined (access) networks may perform automatic prediction and estimation of the second channel frequency response periodically to assess the performance of the channel of communication link when in use over the second frequency spectrum. This may be used to automatically detect any changes to previous estimations of the second channel frequency response over the same channel and enable updates to the corresponding communication link profile for appropriate configuration/provisioning and/or reconfiguration/reprovisioning of the communication link (e.g. appropriate data rate, appropriate margins, appropriate power, etc.) that take into account the changes over the channel. This may enable a higher quality of service to users of the channel when using the new communication technology (e.g. wider-spectrum technology) and the like.

Although the systems and methods describe estimation of the second channel frequency response over the second frequency spectrum using DSL/VDSL/G.fast/G.mgfast and/or wired/cable technologies, this is by way of example only and the invention is not so limited, it is to be appreciated by the skilled person in the art that the systems and methods as described herein may be used to derive, predict, synthetize and/or estimate, from any given set of input channel frequency response measurements and/or simulation thereof, the corresponding estimated second channel frequency response in another frequency spectrum over any type of communication system such as, without limitation, for example wired telecommunications (e.g. Copper, Fiber, Coax, PLC, and the like) and/or wireless telecommunications.

Figure 4:
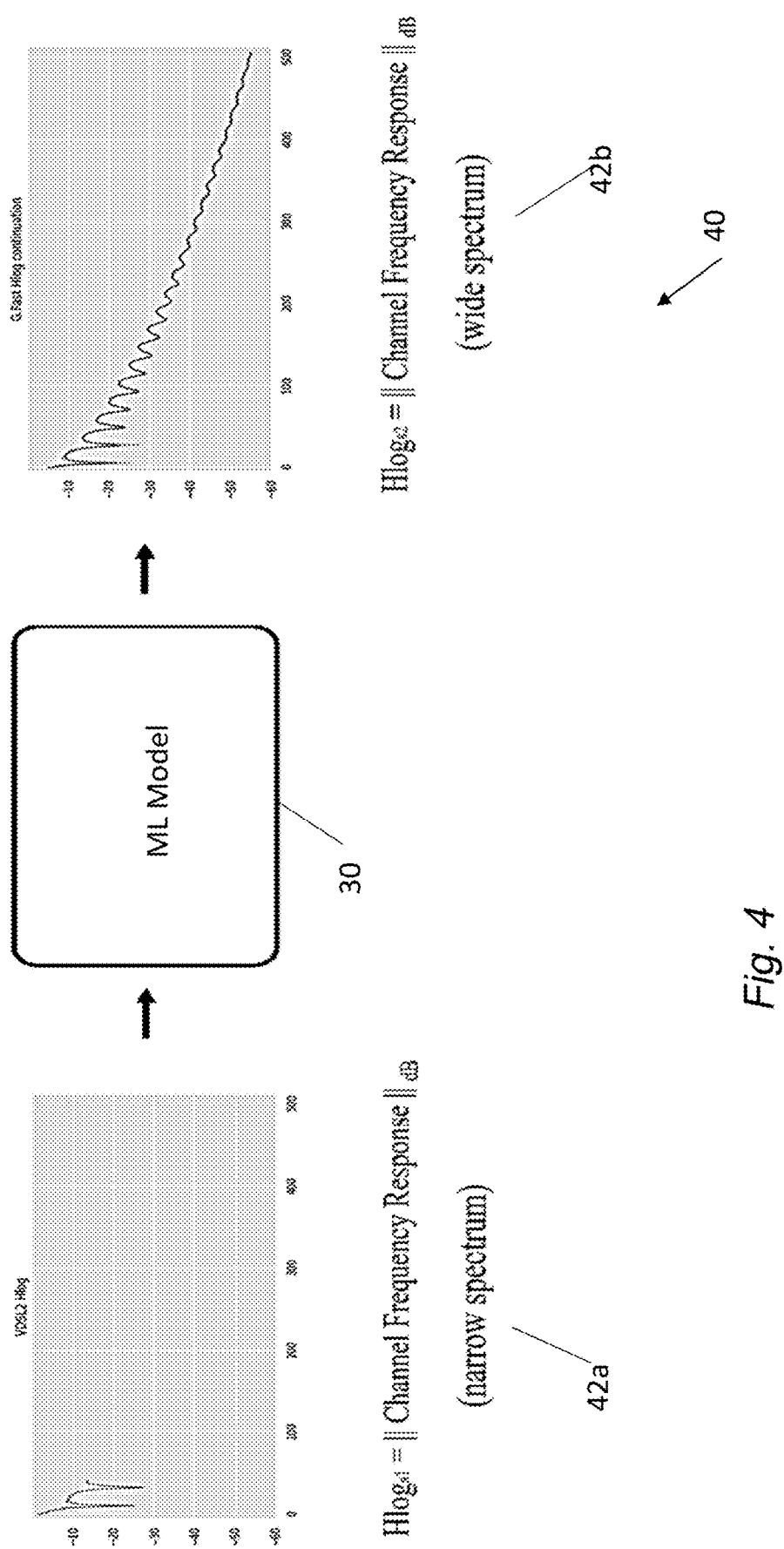
FIG. 4 is a block diagram of a system in accordance with an example embodiment.

FIG. 4 is a block diagram of the apparatus 30 of FIG. 3 in a system 40 configured for implementing a trained machine-learning model for receiving a first channel response data 42a and generating data representative of an estimate of a second channel frequency response 42b of the channel of communication link 16 over a second frequency spectrum, where the second frequency spectrum is different to the first frequency spectrum. The first channel response data 42a may be obtained from a first channel frequency response of the channel over a first frequency spectrum. The first channel frequency response 42a may be generated in response to a transmission over the channel of communication link 16 or a simulation thereof.

The first channel response 42a is a channel response over a first frequency spectrum with a frequency range between a first and a second frequency (e.g. [f1,f2]) and may be denoted $Hlog_{s1}$. In this example, the first frequency spectrum is a narrowband spectrum of approximately, without limitation, for example 0-17 MHz for DSL technologies or other bandwidth for other communication technologies that is considered narrowband. The synthesized or estimated second channel response 42b is a channel response over a second frequency spectrum with a frequency range between a third frequency and a fourth frequency (e.g. [f1',f2']) and may be denoted $Hlog_{s2}$. In this example, the second frequency spectrum is a wideband spectrum of approximately, without limitation, for example 212 MHz for G.fast or 424 MHz for G.mgfast technologies, or other bandwidth that is considered wideband or a wider bandwidth compared with the first frequency spectrum (e.g. [f1,f2]). That is, the fourth frequency (e.g. f2') being greater than the second frequency (e.g. f2). In some embodiments, the fourth frequency (e.g. f2') is one or more orders of magnitude greater than the second frequency (e.g. f2). For example, for DSL systems, the second frequency (e.g. f2) may be in the order of the maximum VDSL2 operating frequency, and the fourth frequency may in the order of the maximum G.fast (such as depicted in FIG. 4) or G.mgfast operating frequency. In this example f1 is the same as f1', but in other embodiments both can be different as well.

The trained ML model of apparatus 30 is any suitable machine-learning model for generating or synthesizing an estimated second channel response 42b in response to data representative of a first channel response 42a applied to the input of the ML model of apparatus 30. The trained ML model of apparatus 30 has been trained to predict, synthesize, or estimate a second channel frequency response over a second frequency spectrum in response to applying data representative of a first channel frequency response 42a over a first frequency spectrum to the ML model. For example, the ML model of apparatus 30 may be based on one or more ML models from the group of: a neural network ML model comprising a plurality of neural network layers, each neural network layer associated with a set of parameters/weights; a convolutional neural network ML model comprising a plurality of convolutional layers; a transformer—based ML model comprising a first and second transformer encoder/decoder neural networks; an encoder/decoder neural network ML model comprising an encoder neural network associated with a first set of parameters/weights and a decoder neural network associated with a second set of parameters/weights; an encoder/decoder ML model based on an encoder convolutional neural network and a decoder convolutional neural network; and/or any other suitable ML model capable of being trained to predict, synthesize, or estimate a second channel frequency response over a second frequency spectrum in response to applying data representative of a first channel frequency response over a first frequency spectrum to the ML model.

In essence, training of the ML model of apparatus 30 may be based on obtaining a training dataset comprising a plurality of training data instances. Each training data instance comprising data representative of an input channel response over an input frequency spectrum and data representative of a target channel response over a target frequency spectrum. Each training data instance may also include data representative of a desired target frequency or a target frequency range. For each training iteration of a plurality of training iterations the following may be performed: one or more training data instances (or a batch of training instances) are applied to the ML model, which outputs one or more estimated second channel frequency responses; an estimation of a loss is performed based on a difference between the one or more estimated second channel frequency responses output by the ML model and the corresponding one or more target channel frequency responses of each of the one or more training data instances. The set of weights of the ML model may be updated based on the estimated loss. In each subsequent iteration of the plurality of training iterations further one or more training instances (e.g. further batches of training instances) are retrieved for applying to the ML model, estimating the loss and updating the weights of the ML model and the like. Training the ML model of apparatus 30 may stop once a stopping criterion is reached, e.g. an error threshold is met, or a maximum number of training iterations is reached, or other performance metric associated with the particular type of ML model is met.

Each training instance may include, for example, data representative of channel response data generated in response to a transmission signal 22 over an example channel of communication link 16 or a simulation thereof, and target channel response data generated in response to a target transmission over the example channel of communication link 16 or a simulation thereof. Each training instance may further include target input parameters or data such as, for example, the target frequency range, maximum target frequency and/or target frequency bandwidth as the application demands. These further input parameters may enable the ML model to learn output an estimated channel frequency response that covers a desired output frequency bandwidth (e.g. scales the output vector of the estimated channel frequency response to the desired output frequency bandwidth).

After training with a number of training examples, the trained ML model of apparatus 30 is configured to receive input channel response data comprising a representation of the channel response of a channel of a communication link, which may be measured or simulated. The trained ML model of apparatus 30 processes the input channel response data to synthesize an estimated channel response over the desired frequency spectrum. The estimated channel response may be used to determine the performance and/or configuration of communication technologies that may be deployed and used over the channel of the communication link over the desired frequency spectrum.

The input channel response data used for generating the training instances for training the ML model and/or for input to the trained ML model of apparatus 30 may be provided in the form of a input channel response vector of channel response values over the input frequency spectrum/range over a first frequency to a second frequency (e.g. [f1,f2]), which represents $Hlog_{s1}$. The input channel response vector may be based on real-time measurements from a channel of a communication link in which a network element 12 or 14 may measure and output the channel response as a vector of amplitude/attenuation values in a standard format and size. For example, the VDSL2 standard G.993.2 in section 11.4.1.1.1, G.fast standard G.9701 in section 11.4.1.2.1, and/or G.mgfast standard G.9711 in section 11.4.1.2.1 provide example measurement requirements, output formats and/or vector sizes for use in measuring the channel response of a VDSL2, G.Fast, and/or G.mgfast channel of a communication link. Two formats for the channel characteristics or response are defined in these standards including for example: a) Hlin(f) a format providing complex values of the channel characteristics (e.g. attenuation values) on a linear scale; and 2) Hlog(f) a format providing magnitude values of the channel characteristics (e.g. attenuation values) on a base 10 logarithmic scale. Although the Hlog(f) channel response is used in the embodiments of the apparatus, system and ML models described herein, this is for simplicity and by way of example only and the invention is not so limited, it is to be appreciated by the skilled person that other channel response formats other than Hlog format such as, for example, the Hlin(f) format may be used for the input and output channel frequency response vectors in some of the embodiments of the apparatus, systems, and/or ML models as described herein as the application demands. For simplicity to illustrate the embodiments, the Hlog format is referred to herein.

In essence, the elements of the input channel response vector (or input Hlog vector) correspond to an ordered set of channel response values (e.g. attenuation) at discrete equally spaced apart frequencies from the first frequency to the second frequency. The first frequency being a minimum frequency of the input frequency spectrum of the input channel response and the second frequency being the maximum frequency of the input frequency spectrum of the channel response. For example, the first element of the input channel response vector may correspond to the channel frequency response value (e.g. attenuation) measured (or simulated) at the first frequency and the last element of the vector may correspond to the channel frequency response value (e.g. attenuation) measured (or simulated) at the second frequency. Each subsequent element of the input channel response vector corresponds to a channel response value for a subsequent frequency within the input frequency range. Similarly, the estimated second channel response output and/or target channel response data of the training data instances may be vectors of channel response values (e.g. attenuations) over the output frequency spectrum/range over a third frequency to a fourth frequency (e.g. [f1',f2]), which represents $Hlog_{s2}$.

Each input channel response vector may be fixed or set to a particular size or length N (e.g. 512 other suitable length) so that the input to the ML model is standardised. This may then require pre-processing of the training dataset to normalise the frequency ranges of the channel responses to fit within the fixed size input vector. For example, should there be one or more training data instances having input channel responses of different frequency spectrums/ranges, then training instance with the maximum frequency range may be found to set the maximum frequency of the input channel response that the ML model may be trained with, thus the last element of the input channel response vector corresponds to this maximum frequency (e.g. maximum frequency of VDSL or VDSL2). This then sets the frequency spacing between the elements of the input vector. Then for other input channel responses with smaller frequency spectrums, the input channel response vector have the corresponding channel response values inserted/interpolated into each element of the vector until the maximum of the smaller frequency spectrum with any remaining elements of the input vector padded with zeros.

Similarly, output channel response vector may also be fixed or set to a particular size or length M (e.g. 512 other suitable length) so that the output to the ML model is standardised. This may then require pre-processing of the training dataset to normalise the frequency ranges of the target channel responses to fit within the fixed size output vector. For example, should there be one or more training data instances having target channel responses of different frequency spectrums/ranges, then training instance with the maximum target frequency range may be found to set the maximum frequency of the output channel response that the ML model may be trained with, thus the last element of the output channel response vector corresponds to this maximum frequency (e.g. maximum frequency of G.fast or G.mgfast). This then sets the frequency spacing between the elements of the output vector. Then for other target channel responses with smaller frequency spectrums, the target channel response vector will have the corresponding channel response values inserted/interpolated into each element of the vector until the maximum of the smaller frequency spectrum with any remaining elements of the input vector padded with zeros.

Alternatively or additionally, multiple ML models may be trained, each corresponding to a particular input frequency spectrum and a particular desired output frequency spectrum. For each ML model, the input channel response vector may be set to a specific size N (e.g. 512 or other suitable value) and the output channel response vector may be set to a specific size M (e.g. 512 or any suitable value). Once each ML model has been trained, they may be combined to form the ML model of apparatus 30, where the apparatus 30 receives the input channel response data and an indication of the desired frequency spectrum and selects the most appropriate ML model from the multiple trained ML models in relation to the corresponding input channel response and desired output frequency spectrum.

Each ML model may be trained using a selected set of hyperparameters that the corresponding ML learning process or algorithm uses, during training, to iteratively generate trained model parameters (e.g. one or more sets of weights and/or coefficients) defining the trained ML model of apparatus 30. Hyperparameters may include, without limitation, for example train-test split ratio, learning rate in optimization algorithms (e.g. gradient descent, etc.), choice of optimization algorithm (e.g., gradient descent, stochastic gradient descent, or Adam optimizer, etc.), choice of activation function in a neural network (NN) layer (e.g. Sigmoid, ReLU, Tanh, etc.), choice of cost or loss function the model will use (e.g. RMSE, MSE, PCA based RMSE etc.), number of hidden layers in a NN, number of activation units in each layer, drop-out rate/probability in NN, number of iterations (epochs) in training, number of clusters in a clustering task, kernel or filter size in convolutional layers, pooling size, batch size, and/or any other parameter or value that is decided before training begins and whose values or configuration does not change when training ends.

The quality of the resulting trained ML model typically depends on the selected set of hyperparameters used to train it. Thus, selecting an appropriate set of hyperparameters (or hyperparameter tuning) may be performed using various optimisation and search algorithms as is well known by a skilled person such as, without limitation, for example, grid search (e.g. testing all possible combinations of hyperparameters), randomized search (e.g. testing as many combinations of hyperparameters as possible), informed search (e.g. testing the most promising combinations of hyperparameters as possible), and/or evolutionary algorithms such as genetic algorithms (e.g. using evolution and natural selection concepts to select hyperparameters) and/or any other hyperparameter tuning algorithm as is well known by the skilled person. The resulting hyperparameters may be used for training the final ML model.

Figure 5:
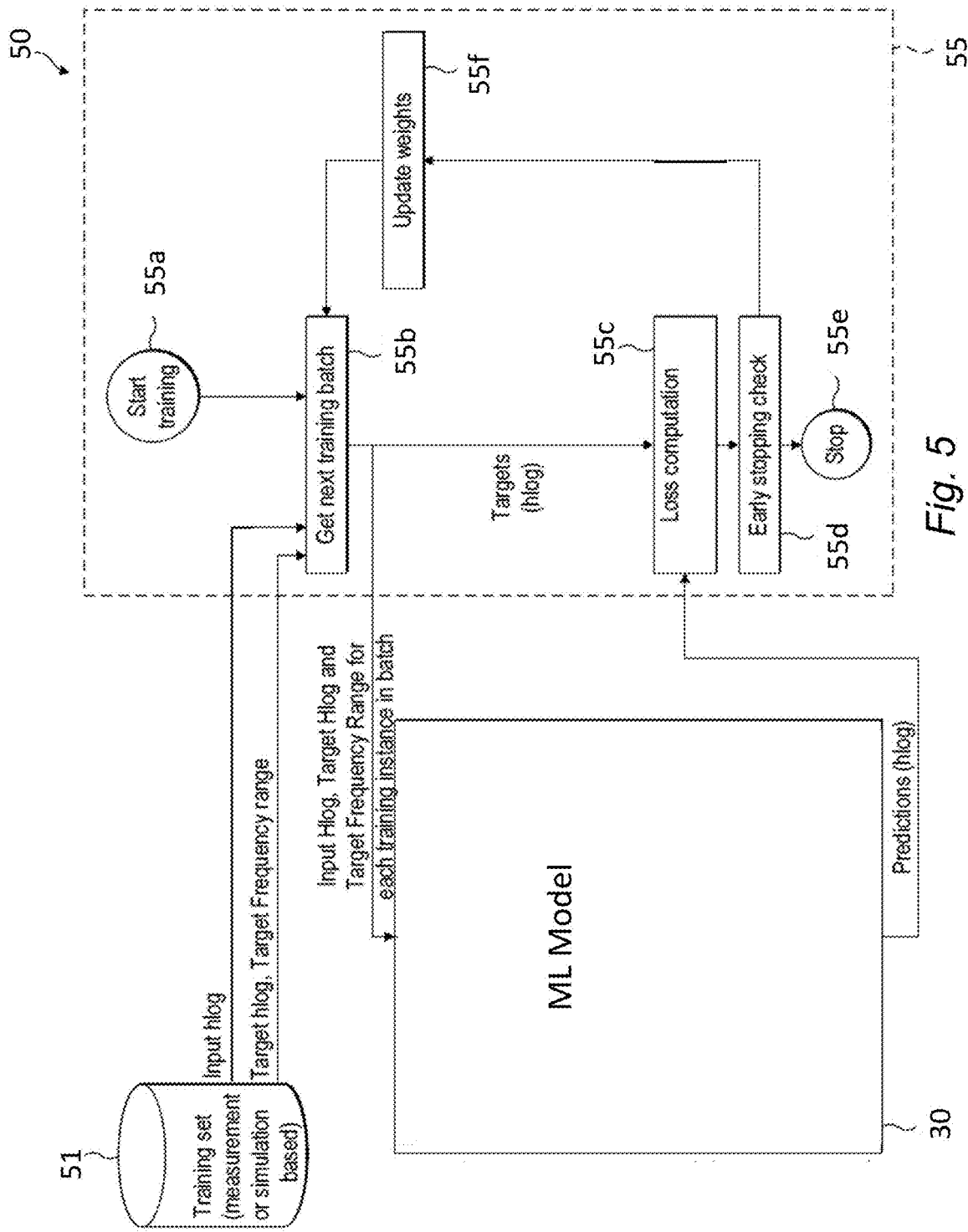
FIG. 5 is a block diagram of a system in accordance with an example embodiment.

FIG. 5 is a block diagram of a means or system, indicated generally by the reference numeral 50, in accordance with an example embodiment of apparatus 30 implementing the ML model. In this figure the apparatus 30 receives the training data, so the apparatus 30 is depicted during its operation in the training mode in which the ML model is trained for synthesizing a second channel frequency response from an input first channel frequency response, where the frequency spectrums are different. In a specific embodiment a training data generation module 51 obtains or generates a training data set comprising a plurality of training data instances. This training data may be generated based on measurement and/or simulation as explained before. As shown in FIG. 5, the training data generation module 51 outputs measured (or simulated) input channel frequency response data (e.g. Input Hlog) together with a target channel response data (e.g. Target Hlog). As an option, a target frequency range or maximum target frequency may also be used as input to the ML model, which may enable the ML model to learn to output a channel response in relation to the target frequency range.

The input channel frequency response data may be represented as a vector of a size N (e.g. N>0) in which the vector elements are represented as channel response values (e.g. attenuation) at equally spaced apart frequencies over a first frequency spectrum range (e.g. [f1, f2]) between a first frequency (e.g. f1) and a second frequency (e.g. f2). The target channel frequency response data may be represented as a vector of a size M in which the vector elements are represented as target channel response values (e.g. attenuation) at equally spaced apart frequencies over a target frequency spectrum range (e.g. [f1', f2']) between a third frequency (e.g. f1') and a fourth frequency (e.g. f2'). In some embodiments the third frequency may correspond to the first frequency.

The training module 55 starts with receiving a training initiation signal 55a, triggering operation of training data generation module 55b to get a next training batch of one or more training instances from the training data set 51. Each of the training instances of a batch may be input, one after the other, to the ML model of apparatus 30. The ML model of apparatus 30 includes a set of weights/parameters arranged according to the particular type of ML model topology used for the ML model, where the set of weights/parameters are configured to generate or predict as output an estimate of a target channel frequency response (e.g. Predictions (Hlog)) of the channel based each input training data instance. A loss computation module 55c receives the target channel response data (e.g. Target Hlog) of the training batch from the training data generation module 55b, compares each target channel response data with the corresponding predicted/estimated target channel frequency response data and calculates (using an appropriate loss function for the type of ML model topology) a loss for use in updating via update weights module 55f the weights/parameters of the ML model of apparatus 30.

With the loss estimated, an early stopping check module 55d of the training module 55 determines whether the ML model of apparatus 30 has been validly trained (e.g. if a particular model accuracy has been achieved or if the model is no longer learning, thereby avoiding overfitting and/or unnecessarily losing computational resources). If so, training module 55 terminates training of the ML model of apparatus 30 at stop module 55e; otherwise, the estimated loss may be used by a suitable updating ML algorithm associated with the ML topology (e.g. gradient backpropagation), where in update weights module 55f, the weights/parameters of the ML model of apparatus 30 are updated in accordance with machine-learning principles and/or the ML model topology of ML model of apparatus 30.

The training data generation module 55b may fetch a further batch of training data from the training data set 51 and the training process as described above with respect to FIG. 5 may be repeated.

A number of possible loss functions that may be used in example implementations of the loss computation module 55c are described below, by way of example. For example, the loss may be implemented, at least in part, based on root-mean squared error (RMSE) between the target channel frequency response and a channel frequency response estimate. For example, the root mean square error between the target frequency response of the channel and the estimated frequency response of the channel has been defined as an objective to minimize, i.e.:

$$\sum_{i=0}^{len(Hlog)} \sqrt{\|Hlog[i] - Hlog[i]\|^2},$$

Figure 6:
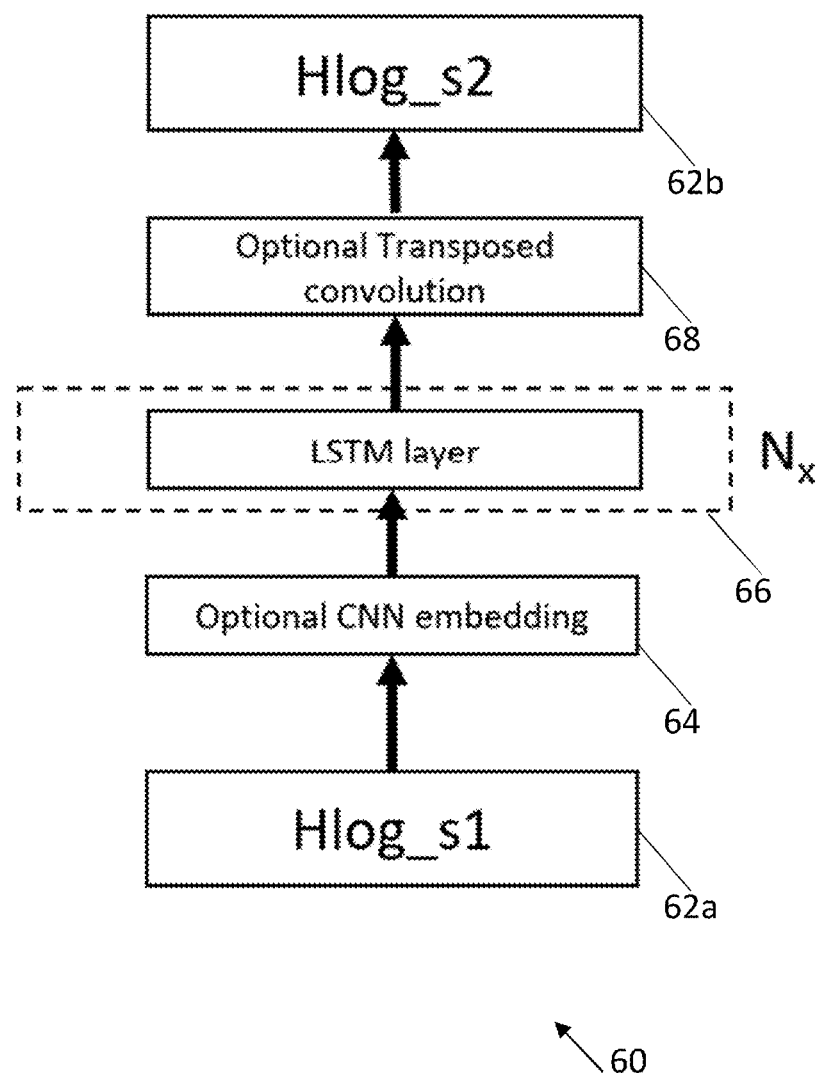
FIG. 6 is a block diagram of an example machine learning model in accordance with an example embodiment.

FIG. 6 is a block diagram of a system, indicated generally by the reference numeral 60, in accordance with an example embodiment. The system 60 implements a neural network and may be used to implement the ML model of apparatus 30 as described herein. Thus, the system 60 may form part of the apparatus 30 and/or system 50 described above.

In this embodiment, the system 60 comprises inputting data representative of the first channel response data (e.g. $Hlog_{s1}$) 62a over a first frequency spectrum to a trained neural network 66 consisting of a number Nx of neural network layers (e.g. Long-Short Term Memory (LSTM) neural network layers), which may be fully connected layers. The first channel response data (e.g. $Hlog_{s1}$) 62a is processed by the layers of the neural network 66 for synthesizing and estimating a second channel frequency response (e.g. $Hlog_{s2}$) 62b over a second frequency spectrum, which is different to the first frequency spectrum. As an option, prior to applying the first channel response data to the neural network 66, the first channel response data may be pre-processed by a convolutional neural network 64 that produces a first channel response embedding for input to the neural network 66. This may be used to better condition the first channel response data and/or extract a relevant feature set of the first channel response data for input to the neural network 66. As another option, the output of the neural network 66 may be coupled to a transposed convolution layer 68 for post-processing and/or synthesizing the output of the neural network 66 to produce the estimated $Hlog_{s2}$ channel response 62b over the second frequency spectrum.

In the system 60, the input data that is provided to the neural network 66 may be represented as a one-dimensional vector of input channel response data or an input channel response data embedding. The input channel response data 62a may comprise an attenuation value at each spaced apart frequency represented by the elements of the vector which spans the first frequency spectrum over frequency range [f1,f2]. It is to be appreciated that other data formats can be used instead of, or in combination with, the data formats of the system 60. For example, for channel responses of space-time coding wireless systems using antenna arrays, the input data may be represented as a two-dimensional matrix of channel response data.

Figure 7:
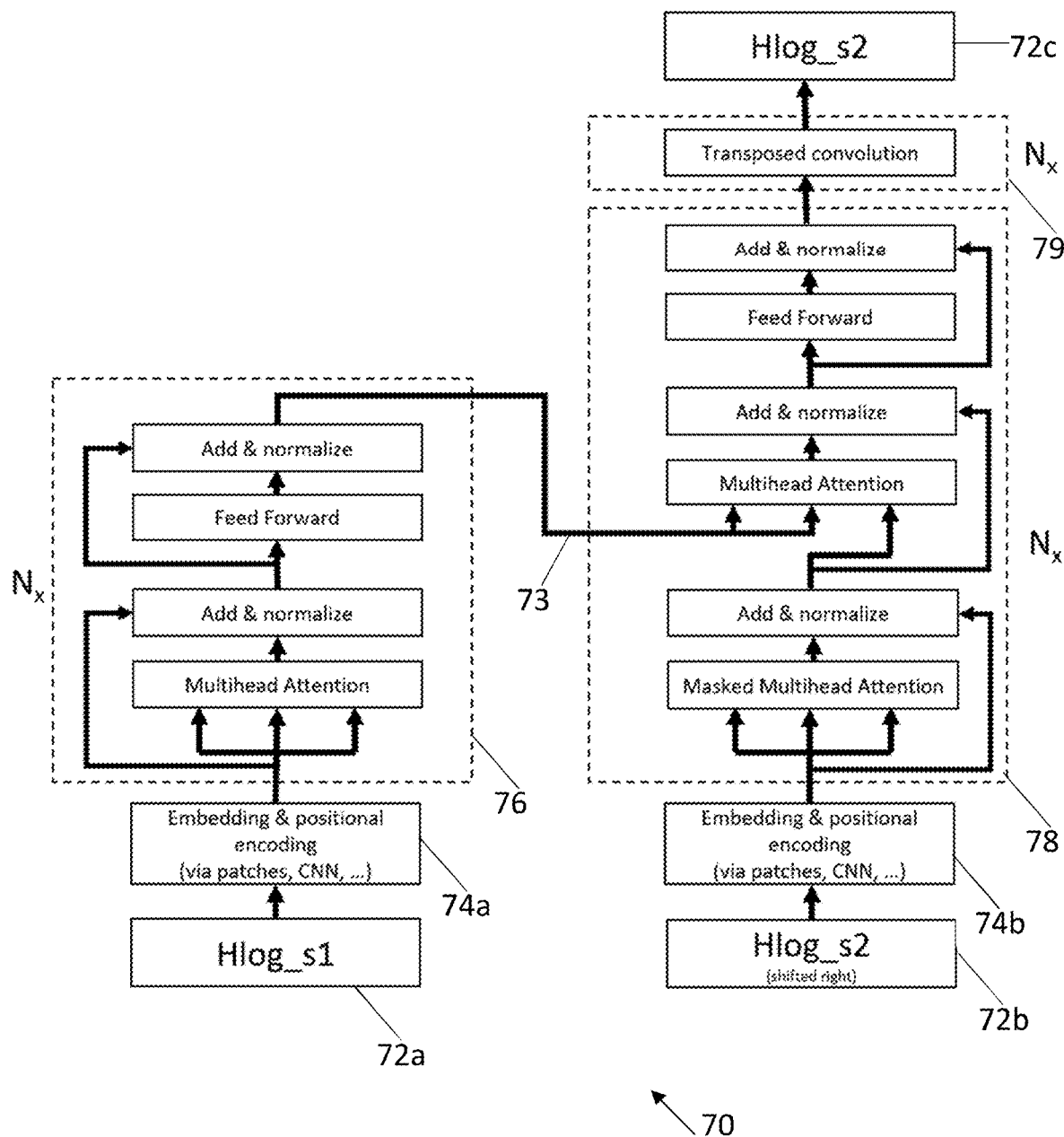
FIG. 7 is a block diagram of another example machine learning model in accordance with an example embodiment.

Although LSTM neural network layers are described, this is way of example only and the invention is not so limited, it is to be appreciated by the skilled person that any suitable type of neural network may be used in place or combined with the LSTM neural network layers of neural network 66 such as, without limitation, for example feed forward neural networks, recursive neural networks, convolutional neural networks, FIG. 7 is a block diagram of a system, indicated generally by the reference numeral 70, in accordance with an example embodiment. The system 70 implements a transformer-based ML model and may be used to implement the ML model of apparatus 30 as described herein. Thus, the system 70 may form part of the apparatus 30 and/or system 50 described above.

In this embodiment, the system 70 comprises inputting data representative of the first channel response data (e.g. $Hlog_{s1}$) 72a over a first frequency spectrum as a sequence to an embedding module 74a for performing an embedding and positional encoding of the first channel response data 72a.

The positional encoding enables the transformer ML model 70 to make use of the order of the first channel response data sequence. The embedding of the first channel response data 72a is applied as a sequence to a transformer encoder neural network 76 comprising number Nx≥1 of encoder transformer neural network layers, which process the embedding of the first channel response data 72a to extract an encoding 73 of the relevant features of the input channel response data for output to a second transformer decoder neural network 78.

Each encoder transformer neural network layer of the first transformer encoder neural network 76 comprises a multihead attention module, add and normalise module, feedforward neural network layer(s), and a further add and normalise module coupled together for processing the input embedding of the first channel response data 72a. The encoded input channel response data 73 that is output from the final encoder transformer neural network layer is input to the transformer decoder neural network 78.

Training uses a plurality of training instances, in which each training instance includes at least data representative of an example input channel frequency response data (e.g. an input vector) of an input frequency spectrum and target channel frequency response data (e.g. the target output vector) of a target frequency spectrum. During training, for each training instance, the input channel frequency response data 72a is input to the embedding module 74a and subsequently to the transformer encoder neural network 76 for outputting an encoding of the input channel frequency response data 72a.

At the same time, the target channel frequency response data (e.g. $Hlog_{s2}$) 72b over the target frequency spectrum is input as a sequence to a second embedding module 74b for performing an embedding and positional encoding of the target channel response data 72b. The positional encoding enables the transformer ML model 70 to make use of the order of the first and target channel response data sequences during training. The embedding of the target channel response data 72b is applied as a sequence to a second transformer decoder neural network 78 comprising a number Nx>=1 of decoder transformer neural network layers, in which the first stage of the first decoder transformer neural network layer processes the embedding of the target channel response data 72b to partially mask the embedded target channel response data sequence by the masked multihead attention module and add and normalise module. The partially masked embedded target channel response data sequence is then applied and combined with the encoding of the input channel response data to a second stage of the first decoder transformer neural network layer. The masked multihead attention module is configured to ensure that ML model 70 can only use the information in the frequencies of the input channel response sequence below the frequency in the input sequence that it is predicting.

The second stage decoder transformer neural network layer of the transformer decoder neural network 78 includes a multihead attention module, add and normalise module, feedforward neural network layer(s), and a further add and normalise module coupled together for processing the encoding of the input channel response 72a output from the encoder transformer neural network 76 and the partially masked embedding of the target channel response data 72b. The second stage decoder neural network layer may be repeated a further Nx−1 times. The output of the decoder transformer neural network 78 may be transformed by a number of Nx transposed convolutional neural network layers 79 for synthesizing and estimating the target channel frequency response (e.g. $Hlog_{s2}$) 72c. During training, a loss function (not shown) may be used for comparing the estimated target channel frequency response and the input target channel frequency response 72b for use in updating the weights of the embedding modules 74a and 74b, transformer encoder neural network 76 and transformer decoder neural network 78, and transposed convolutional layers 79. This may be repeated until a stopping criterion is reached such as, for example, without limitation, the transformer neural network 70 is considered to be trained, e.g. an error threshold is reached between the target input and output, a maximum number of training iterations has been reached and the like.

Once trained, the trained transformer neural network 70 may receive an input sequence of channel response data 72a (e.g. an Hlog vector) associated with a channel that has been measured in real-time and/or determined via simulation of the channel. The input sequence of channel response data 72a is applied to the embedding module 74a coupled to the transformer encoder neural network 76, which outputs an encoding sequence (or encoded Hlog) of the input channel response data 72a. The second stage neural network layer of the transformer decoder neural network 78 receives the encoded input sequence of channel response data 72a and processes this to output a synthesized or estimated second channel response data 72c via the transposed convolutional layers 79.

More specifically, the input sequence of channel response data 72a may be an ordered sequence of N channel response values (e.g. 512 or any suitable length vector) of different tones equally spaced apart in ascending order of frequency over a first frequency spectrum from a first frequency to a second frequency (e.g. [f1,f2]). This means the trained transformer neural network 70 is used iteratively, where each element of the input sequence of channel response data 72b is input in order of ascending frequency resulting in an encoded Hlog sequence. The number of iterations being based on the length N of the input sequence of channel response data 72a. The transformer decoder neural network 78 uses the encoded Hlog sequence as one of its inputs and a second input sequence from the second input 72b to predict and estimate an output sequence representing the estimated second channel frequency response over the second frequency spectrum, where the second input sequence that is applied to the second input 72b changes after each iteration.

At the first iteration, the second input sequence that is applied to the second input 72b will be composed of a single start tone with a default channel response value that was used to train the trained transformer neural network 70 followed by N−1 tones representing unknown channel response values (e.g. these may be zero padded). The decoder neural network 78 and convolutional layers 79 combines the encoded Hlog sequence and the second input sequence to infer the predicted channel response value for the first tone in the output sequence of estimated second channel response data 72c. In the next iteration, the transformer decoder neural network 78 will change the second input sequence 72b by replacing the channel response value for the first tone in the second input sequence 72b with the predicted channel response value for the first tone that was output at 72c. The second input sequence 72b thus includes the default channel response value for the default start tone followed by the first predicted channel response value for the first tone followed by N−2 tones representing unknown values (e.g. zero padding). The decoder neural network 78 and convolutional layers 79 combines the encoded Hlog sequence and the updated second input sequence to infer the predicted channel response value for the second tone in the output sequence of estimated second channel response data 72c. This iterative process continues until all channel response values for the corresponding tones have been predicted by the trained transformer neural network 70 based on what has been predicted in the previous iteration. The resulting output sequence represents the estimated second channel response 72c over the second frequency spectrum.

In the system 70, the input data that is provided to the transformer neural network 76 may be represented as a one-dimensional vector sequence of input channel response data or an input channel response data embedding. The input channel response data 72a may comprise an attenuation value at each spaced apart tone (frequency) represented by the elements of the vector which spans the first frequency spectrum over frequency range [f1,f2]. It is to be appreciated that other data formats can be used instead of, or in combination with, the data formats of the system 70. For example, for channel responses of space-time coding wireless systems using antenna arrays, the input data may be represented as a two-dimensional matrix of channel response data.

Figure 8:
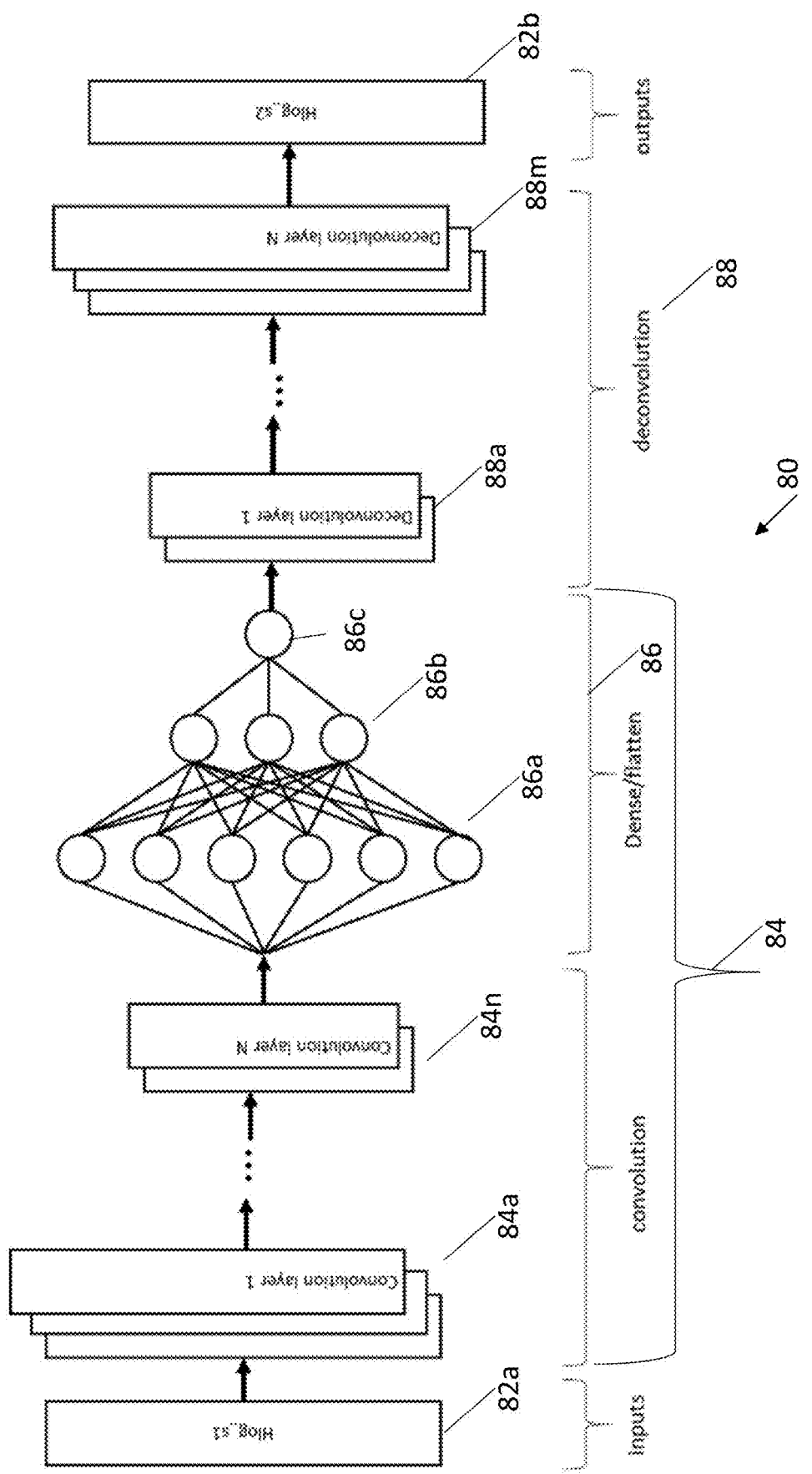
FIG. 8 is a block diagram of a further example machine learning model in accordance with an example embodiment.

FIG. 8 is a block diagram of a system, indicated generally by the reference numeral 80, in accordance with an example embodiment. The system 80 implements a convolutional encoder-decoder and may be used to implement the ML model of apparatus 30 as described herein. Thus, the system 80 may form part of the apparatus 30 and/or system 50 described above.

In this embodiment, the system 80 comprises a convolution encoder 84 consisting of a plurality of convolutional and/or pooling layers 84a-84n (e.g. N convolutional and/or pooling layers) and a fully connected layers module 86, and a deconvolution decoder 88 comprising a pool of deconvolution layers 88a-88m (e.g. M deconvolution and/or pooling layers).

The convolution encoder 84 is part of a neural network performing successive layers 84a-84n of convolution and pooling in order to create and extract relevant channel response features from the input channel frequency response data (e.g. $Hlog_{s1}$) input to the convolutional encoder 84 as a vector via input module 82a. The input data to the encoder 84 may consist of a one dimensional vector representing the input channel frequency response data. Once these features are isolated and represented as a vector by the fully connected layers module 86 of the encoder 84, they are transformed, by deconvolution layers 88a-88m of the deconvolution module 88, into sequences. Over the deconvolution layers, these sequences get refined and extended up-to be able to produce an estimated $Hlog_{s2}$ channel response of a different frequency spectrum to that of the input channel frequency response data.

In the system 80, the input data as provided to the convolution encoder 84 are represented as a one-dimensional vector of input channel response data, which may comprise an attenuation value at each spaced apart frequency represented by the elements of the vector. It is to be appreciated that other data formats can be used instead of, or in combination with, the data formats of the system 80. For example, for channel responses of space-time coding wireless systems using antenna arrays, the input data may be represented as a two-dimensional matrix of channel response data.

The fully connected layers module 86 of the encoder 84 may comprise a plurality of fully connected neural network layers 86a-86c, (in this example three neural network layers are illustrated). The extracted channel response features that are output from the convolutional layers 84a-84n of the encoder 84 are passed to one or more fully connected layers 86a-86c of the encoder 84 that aim to create a latent space of lower dimension that combines the features extracted from the input channel response data (e.g. $Hlog_{s1}$). This latent space will be the starting point of the Hlog signal reconstruction by the layers 88a-88m of the deconvolution module 88.

The deconvolution module 88 (or transposed convolutional layers) offers a learnable way of upsampling an input sequence and can be used to intelligently project an input feature map to a higher spatial space. Several transposed deconvolutional layers may be stacked to transform the input feature map into an Hlog having a length, for example, of M frequency values or tones (e.g. 512 or other suitable size or number of tones).

Although the fully connected layers module 86 is depicted in system 80 as being part of convolution encoder 84, this is for simplicity and by way of example only, it is to be appreciated by the skilled person that the encoder 84 may simply be a convolutional encoder with convolutional layers 84a-84n, which may subsequently be coupled to a fully connected layers module 86 for outputting the extracted channel response feature set for input to the convolutional decoder 88 and the like.

Figure 9:
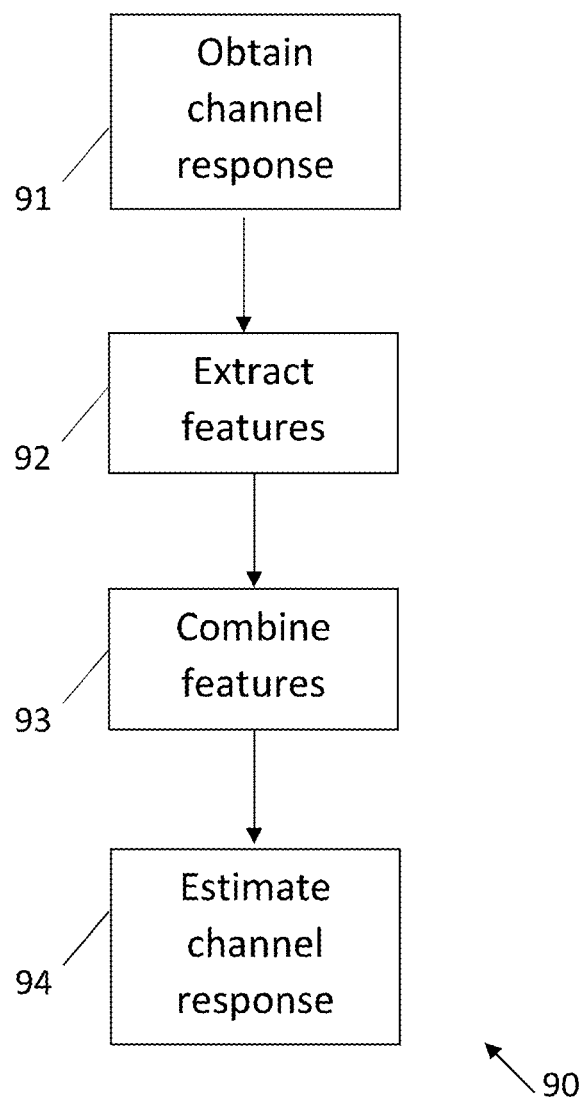
FIG. 9 is a flow chart showing an algorithm in accordance with an example embodiment.

FIG. 9 is a flow chart showing method steps, e.g. an algorithm, indicated generally by the reference numeral 90, in accordance with an example embodiment. The algorithm 90 may be implemented by/using the apparatus 30 for implementing the ML model. In this example, the ML model may be based on the encoder-decoder convolutional model 80 of FIG. 8, or any other suitable encoder-decoder neural network or ML model and the like.

The example method 90 starts at operation 91, where an input channel response over a first frequency spectrum is obtained by measurement of a transmission signal or simulation. The input channel response (e.g. $Hlog_{s1}$) may have been obtained via transceiver unit measurements, e.g. in response to a transmission of a reference signal over a channel of communication link 16 or by a simulation thereof.

At operation 92 a channel response feature set is extracted from the input channel response data by applying the input channel response data to an encoder (e.g. a suitably trained convolutional encoder may be used to extract a feature set), which may be further combined at operation 93 (e.g. mapping the encoder output into a latent space using fully connected layers configured for densification/flattening) to generate a suitable extracted channel response feature set input for applying at operation 94 to a decoder (e.g. a suitably trained convolutional decoder) configured for generating an estimate of a second channel frequency response of the channel (e.g. $Hlog_{s2}$) over the second frequency spectrum, which is different to the first frequency spectrum.

Figure 10:
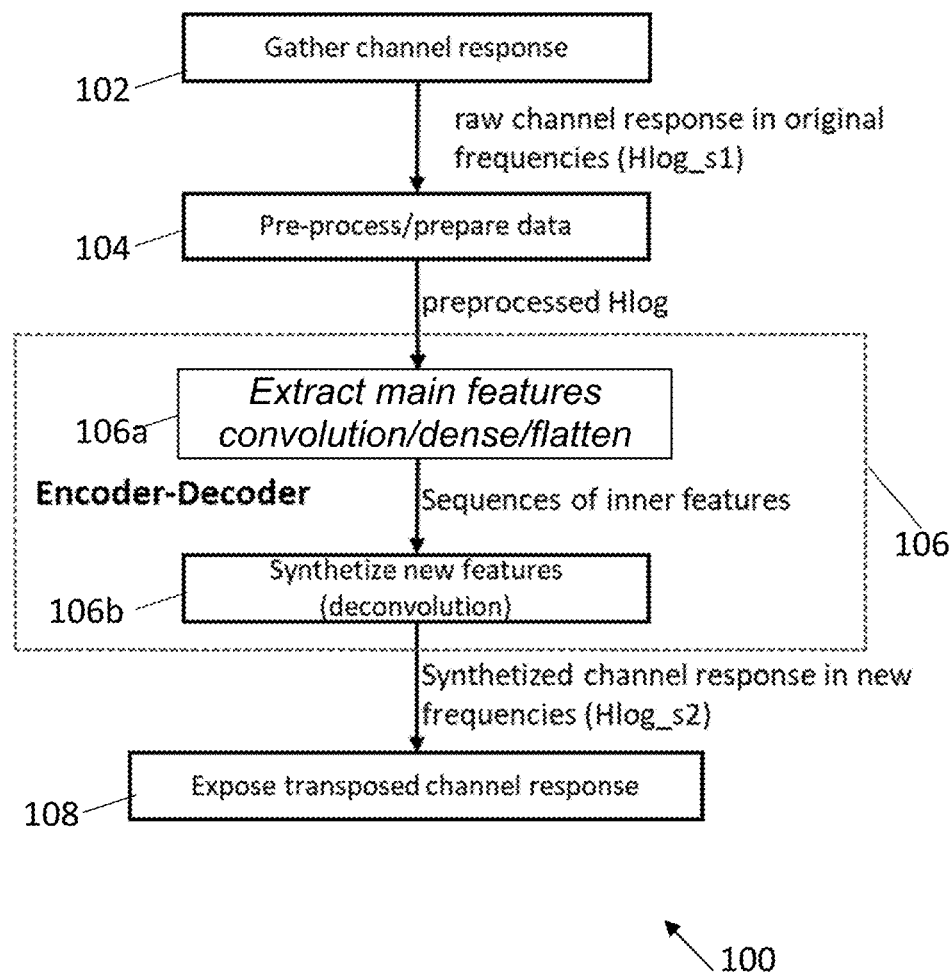
FIG. 10 is a flow chart showing an algorithm in accordance with an example embodiment.

FIG. 10 is another flow chart showing method steps, e.g. an algorithm, indicated generally by the reference numeral 100, in accordance with an example embodiment. The algorithm 100 may be implemented by/using the apparatus 30 for implementing the ML model as an encoder/decoder ML model, or any other suitable encoder-decoder neural network and the like.

The example method 100 starts at operation 102, where a raw input channel response over a first frequency spectrum is gathered or obtained by measurement of a transmission signal or simulation. The raw input channel response (e.g. $Hlog_{s1}$) may have been obtained via transceiver unit measurements, e.g. in response to a transmission of a reference signal over a channel of communication link 16 or by a simulation thereof. For example, the raw input channel response may be a measured channel response of a wired network line ($Hlog_{s1}$) in a given, original, spectrum (e.g. VDSL2 having a frequency spectrum of 17 MHz). The raw input channel response may be provided as a first vector.

At operation 104, the raw input channel response vector may be pre-processed/prepared for input to the encoder/decoder ML model. The pre-processing of the raw input channel response may include operations such as, without limitation, for example alignment of carrier grouping to the one supported by the encoder-decoder ML model, filling of any missing vector elements of the input channel response vector or frequency gaps by linear regression/interpolation, masking of values of elements of the input channel response vector under noise floor and/or replaced by white noise, and/or zero padding the input channel response vector to meet the size of the input vector for input to the ML model.

At operation 106, the pre-processed input channel response vector is applied to the encoder-decoder ML model, which performs several main operations, where operation 106a is for extracting the main channel response features from the raw input channel response, and operation 106b is for synthetizing (or constructing) the estimated output channel response transposed into the new desired frequency spectrum (e.g. $Hlog_{s2}$).

At operation 106a a channel response feature set is extracted from the pre-processed input channel response vector by applying the pre-processed input channel response vector to an encoder (e.g. a suitably trained convolutional encoder may be used to extract a feature set) with one or more fully connected layers (e.g. fully connected layers configured for densification/flattening) configured for representing the extracted channel feature sets as sequences of inner features within a latent space for input, at operation 106b, into a decoder (e.g. a suitably trained convolutional decoder) configured for transforming the sequences up through multiple decoder layers to generate synthesized new features comprising an estimate of a second channel frequency response of the channel (e.g. $Hlog_{s2}$) over the second or desired frequency spectrum, which is different to the first frequency spectrum. In operation 108, the estimated second channel frequency response over the desired frequency spectrum is exposed or output for further analysis of the performance of the channel.

Figure 11:
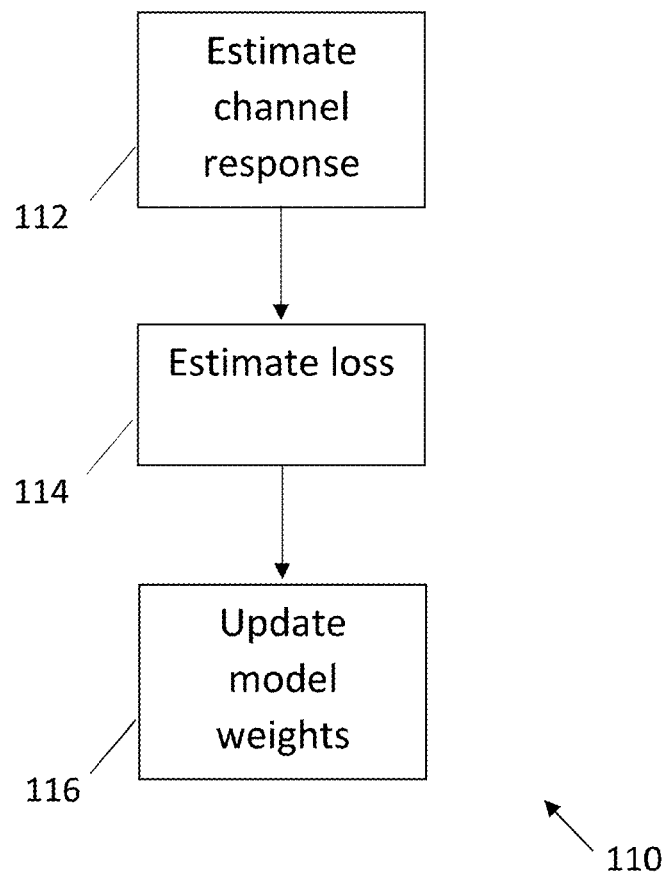
FIG. 11 is a flow chart showing another algorithm in accordance with an example embodiment.

FIG. 11 is a flow chart showing an example method or algorithm for applying a loss function to update weights of an ML model, indicated generally by the reference numeral 110, in accordance with an example embodiment.

The algorithm 110 starts at operation 112, where a target channel frequency response is estimated for specific training data sets which are determined beforehand. For example, the operation 112 may be implemented using the algorithms 90 or 100 or some similar algorithm.

Such a training data set should contain examples of input channel frequency responses over corresponding input first frequency spectrums (e.g. input $Hlog_{s1}$) and the corresponding target channel frequency responses over corresponding desired second frequency spectrums (e.g. $Hlog_{s2}$). This means that for each different network topology loop length, cable type, termination, presence or not of impairments like bridged-tap, contact issue or other types of impairments etc.), a training data set comprising the input channel frequency responses (=input) and corresponding target channel frequency responses is to be provided. The training data sets could be obtained, for example, by real-time in the field measurements, systematic lab measurements, and/or simulation. Given that the ML model is a system that leverages Deep Learning, training the ML model requires a lot of example training instances (perhaps hundreds of thousands or millions) for it to be able to converge within an error threshold and the like.

As an option, the training data set can also be obtained via simulations, which represent different loop topologies and/or channel impairments and which are able to generate the input channel frequency responses at an input frequency spectrum and corresponding target channel frequency responses at target frequency spectrums, the input and target frequency spectrums being different. For example, the input frequency spectrum may be a narrowband frequency spectrum and the target frequency spectrum may be a wideband frequency spectrum much larger than the input frequency spectrum. Simulations enable the correct labelling of simulator data and may be used to generate millions of training data sets.

At operation 114, a loss is estimated, based on a difference between a synthesized channel frequency response estimate at a synthesized frequency spectrum that is predicted/output by the ML model (e.g. as estimated in the operation 112) and a target channel frequency response at a target frequency spectrum e.g. a known channel frequency response as being part of the training data set.

At operation 116, model weights of the ML model that are configured, depending on the ML model topology, and used to generate the synthesized channel frequency response estimate are updated based on the loss estimated in the operation 114. For example, the model weights may be updated using backpropagation or any other appropriate update algorithm depending on the ML model topology.

Figure 12:
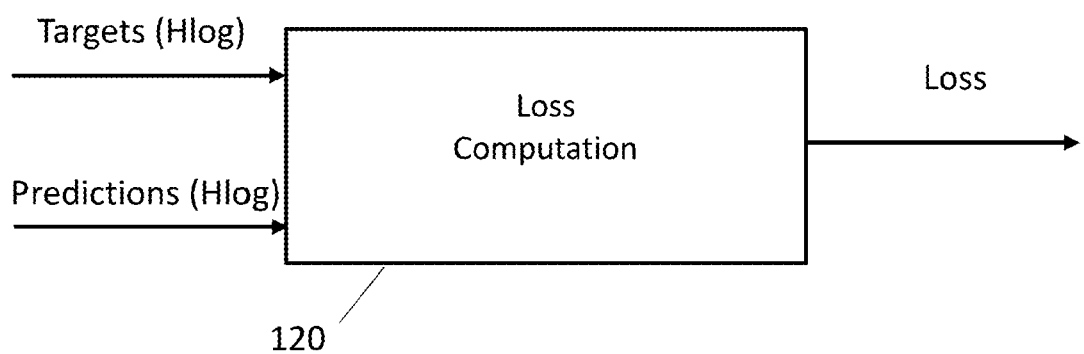
FIG. 12 is a block diagram of a loss computation module in accordance with an example embodiment.

FIG. 12 is a block diagram of a loss computation module 120 in accordance with an example embodiment. The loss computation module 120 may be used for implementing the operation 114 of method 110 of FIG. 11 as well as being part of the apparatus 30 and/or system 50.

As shown schematically in FIG. 12, the loss computation module 120 receives a predicted channel frequency response estimate (e.g. as obtained in the operation 112, or at the output of the decoder or other ML model), receives a known or target channel frequency response and calculates or estimates a loss (thereby implementing the operation 114 of the algorithm 110). Further details of possible loss methods for calculation of this loss, so called loss-functions are provided in detail below.

A number of possible loss functions that may be used in example implementations of the loss computation module 120 are described below, by way of example. In essence, for the described implementations, the aim is to minimize the loss function until convergence to a certain predetermined acceptable error value is reached between the target outputs and predicted outputs. Alternatively or additionally, the aim may be to minimise the loss function until an acceptable error value is reached. This typically depends on computing resources available and/or acceptable model performance requirements as is well known to the skilled person.

The loss may be implemented, at least in part, based on root-mean squared error (RMSE) between the target channel frequency response and a channel frequency response estimate. For example, the root mean square error between the target frequency response of the channel and the estimated frequency response of the channel has been defined as an objective to minimize, i.e.:

$$\sum_{i=0}^{len(Hlog)} \sqrt{\|Hlog_t[i] - Hlog_p[i]\|^2},$$

where len(Hlog) is the length of the Hlog vectors (or channel response vectors), $Hlog_t[i]$ is the i-th channel response value of the target Hlog, and $Hlog_p[i]$ is the i-th predicted channel response value output from the ML model.

Alternatively a loss function based on a hybrid weighted error, such as weighted sum (using e.g. weights w1, w2 and w3 in the formula below) between the general root mean square, a local maximum and a weighting over the derivatives, may be used in which a set of weights (e.g., w1, w2 and w3) are found that balances the different terms of the loss function to enable the ML model to predict the general slope and pattern of the target Hlog whilst minimising the hybrid weighted error. An example loss function based on a hybrid weighted error may be expressed mathematically as:

$$w_1 * \sum_{i=0}^{len(Hlog)} \sqrt{\|Hlog_t[i] - Hlog_p[i]\|^2} + w_2 * \max_i \|Hlog_t[i] - Hlog_p[i]\| + $$
$$w_3 * f(\text{derivatives}(Hlog_t)) * \sum_{i=0}^{len(Hlog)} \sqrt{\|Hlog_t[i] - Hlog_p[i]\|^2},$$

The hybrid error may suffer from two potential drawbacks:

- The performance may be dependent on the overall shape of each Hlog (an initial positive slope of the overall shape might prioritize a lot the weights. Also, simply a different loop length, inducing a general slope which is different, might produce different error terms, which is also not suitable); and
- The use of hybrid error may not completely solve the problem between, for instance, dominant/large patterns vs. small/less dominant ones.

In order to capture the relevant information from data, independently from the shape of the patterns and to process it in a fair way, loss function based on a principal component analysis (PCA) plus whitening process may be used. For example, learning the PCA transformation per batch on the target channel frequency response estimates, reducing the dimension (e.g. to 256 or other suitable length) and performing a scaling (whitening) function may be suitable. Applying the same learned transformation on the prediction channel frequency response estimates and creating a RMSE between these values may therefore be done, i.e.:

$$\sum_{i=0}^{255} \sqrt{\|PCA_{whitened}(Hlog_t[i]) - PCA_{whitened}(Hlog_p[i])\|^2}$$

This approach tends to process the various types of patterns in a fair way however suffering from a limited ability to take into account the general slope.

As a refinement, this loss function may be modified to include an extra term in which the batch mean may be added to the global error. The batch mean may be calculated by calculating the mean value across the tones of the batch of Hlogs (e.g. mean value across 512 tones of an batch of Hlogs). A major contributor to the remaining inaccuracies may reside in the fact that the batch mean may not be suitable for any batch sample. Or, said differently, we are facing a "non-stationary process", at least because the mean between each example Hlog may not be the same, hence while applying techniques like principal component analysis (PCA)/whitening, inaccuracies may be experienced.

One approach to seek to address this, is to (at least partially) stationarize the batch examples, i.e. try to force each sample tone in the batch of Hlogs to have the same mean. This has been done by fitting a "a*sqrt(f)+b" regression model within the curve, to remove it, and then to follow a similar PCA whitening process as in the previous section. This regression term (calculated over the length of the target Hlog vector) has therefore to be predicted and added to the error, having therefore a combined objective as follows:

$$\sum_{i=0}^{255} \sqrt{\|PCA_{whitened}(Hlog_{t,stationary}[i]) - PCA_{whitened}(Hlog_{p,stationary}[i])\|^2} + $$
$$w_1 * \sum_{i=0}^{len(Hlog)} \sqrt{\|\text{regression}(Hlog_t)[i] - \text{regression}(Hlog_p)[i]\|^2}$$

As an example, the weight $w_1$ is a parameter that may be varied to balance the effects of the PCA whitening term and the regression term. This parameter may be found in addition to the hyperparameters for training the ML model (e.g. convolutional encoder-decoder) using a genetic algorithm as is well known to the skilled person and briefly outlined herein. In some examples, it has been found that $w_1=0.05$ may represent a fair balance between the two terms and, as such, was used to train a convolutional encoder-decoder in the examples described below system. Although a $w_1=0.05$ is described herein, this is for illustrative purposes and by way of example only and the invention embodiments are not limited to this value, so it is to be appreciated by the skilled person that the weight $w_1$ may depend on a range of factors such as, without limitation, for example the training data set, the type of communication link (e.g. wired, wireless, DSL, VDSL, G.mgfast, 3G and the like), and also on the type of ML model that is being used etc., and so a different weight $w_1$ may be found with the set of hyperparameters chosen for use in training each type of ML model that may be used. In essence, if the weight $w_1$ is too low, then this will minimise the effect of the regression term of the loss function and may not match the slope or global tendency of the target channel response. However, if the weight $w_1$ is too high, then this will minimise the effect of the first PCA whitening term of the loss function and hence the ML models focus on pattern reconstruction may be poor. When the weight $w_1$ is set correctly, i.e. a well balanced weight factor, then this will force the model to make predictions having good patterns in the predicted channel response and matching the slope of the target channel response with minimal error.

FIGS. 13a to 13d illustrate a series of plots, indicated generally by the reference numerals 130, 132, 134, and 136, showing outputs of an example embodiment. In each of the plots, the y axis illustrates the magnitude of the channel response values and the x-axis represents the frequency in MHz. Each of the plots 130, 132, 134 and 136 show examples of input channel responses shown by the solid black line between 0 to 17 MHz (first frequency spectrum), target channel response used in training is shown by the light gray line from 2.2 MHz to 484 MHz (second frequency spectrum), and predicted channel response estimate (estimated second channel frequency response over the second frequency spectrum) is shown by the dashed line from 2.2 to 484 MHz for different channel impairments using convolutional encoder-decoder 80 trained with a combined objective loss function based on the PCA whitening process and the regression term as described above. In this embodiment, as can be seen from the plots 130, 132, 134 and 136 the error tends to present a fair balance between the two terms.

The convolutional encoder-decoder 80 has been trained with a training dataset including large diversity of training instances of input channel frequency responses ($Hlog_{s1}$) for a VDSL2 channel in the VDSL2 frequency spectrum (e.g. 0-17 MHz) representing a variety of cabling situations (e.g. various loop lengths, cable types, cable interconnections, cable impairments, and the like), and corresponding target channel frequency responses for the G.fast frequency spectrum (i.e. frequency bandwidths of 106 MHz or 212 MHz) and/or the G.mgfast frequency spectrum (i.e. frequency bandwidth of 424 MHz).

The hyperparameters for use in training the convolutional encoder-decoder 80 were identified based on performing a genetic algorithm as is well known by the skilled person to search for and optimise the hyperparameters. Genetic algorithms can generate high-quality solutions to optimization and search problems by relying on evolutionary, natural selection, and biologically inspired concepts such as mutation, crossover and selection. A genetic algorithm was used over the sets of possible hyperparameters that may be used for training the convolutional encoder-decoder 80 to identify an optimal set of hyperparameters for training. For example, some of the hyperparameters that were considered by the genetic algorithm for identifying the hyperparameters for training the convolutional encoder-decoder 80 were based on the following sets of hyperparameter grid value ranges of:

| Hyperparameter description | Grid values |
| --- | --- |
| Layer 1 conv channels | [8, 16, 32] |
| Layer 1 conv kernel size | [4, 8, 16, 32] |
| Layer 1 max pooling window size | [2, 4, 8] |
| Layer 2 conv channels | [32, 64, 128] |
| Layer 2 con kernel size | [4, 8, 16, 32] |
| Layer 2 max pooling window size | [2, 4, 8] |
| Use a third convolutional layer | [True, False] |
| Layer 3 conv channels | [32, 64, 128] |
| Layer 3 conv kernel size | [4, 8, 16] |
| Layer 3 max pooling window size | [2, 4, 8] |
| Dense layer units | [1024, 2048, 4096] |
| Layer 1 transp conv channels | [128, 256, 512] |
| Layer 1 transp conv kernel size | [2, 4, 8] |
| Layer 1 transp conv stride | [2, 4, 8] |
| Layer 2 transp conv channels | [32, 64, 128] |
| Layer 2 transp conv kernel size | [4, 8, 16, 32] |
| Layer 2 transp conv stride | [2, 4, 8] |
| Layer 3 transp conv channels | [32, 64, 128] |
| Layer 3 transp conv kernel size | [4, 8, 16, 32] |
| Layer 3 transp conv stride | [2, 4, 8] |
| Layer 4 transp conv channels | [16, 32, 64] |
| Layer 4 transp conv kernel size | [16, 32, 64] |
| Layer 4 transp conv stride | [2, 4, 8] |
| Layer 5 transp conv kernel size | [16, 32, 64] |

Other hyperparameters (e.g. train-test split ration, learning rate, optimisation algorithm, activation functions, loss functions, etc.) as described previously may also be prechosen and/or considered by the genetic algorithm when identifying the optimal or most appropriate set of hyperparameters for use in training the convolutional encoder-decoder ML model 80. In this example, the loss function used for training was based on the above described objective function with a stationarised PCA whitening term and a regression term.

Although the above list of hyperparameter grid values have been described for use in training the convolutional encoder/decoder ML model 80, this is by way of example only and the invention is not so limited, it is to be appreciated by the skilled person that any other set of hyperparameter grid values, any other number of convolution layers, pooling layers, deconvolution layers and the like, and/or other ranges of hyperparameter grid values may be used for a convolutional encoder/decoder ML model 80 as described herein and/or as the application demands.

The training data set may include a plurality of training instances for a variety of channel impairment categories and/or channel configurations. For example, for a communication link with a channel comprising a DSL twisted pair cable, the different categories of cable that may be used during ML model training include, without limitation, for example: non impaired line (NIL), bridged tap (BTap), insulation fault, mismatched segments, degraded contact, and/or any other type of channel impairment or channel configuration/materials and the like that may affect the performance of communicating over the channel of the communication link with current and/or new communication technologies and/or different frequency spectrums and the like. The training data set comprising a plurality of training instances may be built from collecting real-world measurements and/or via simulation of one or more configurations of the channel communication link (e.g. real-world measurements of the physical cable or simulation thereof for various impairments, configurations and the like). Each training instance includes data representative of a measured or simulated input channel frequency response over an input frequency spectrum and a target channel frequency response at the target frequency spectrum. These may be used to train the ML model, where the trained ML model is subsequently used with real-world input channel frequency response measurements for synthesizing an estimate of a second channel frequency response at the desired frequency spectrum.

Figure 13A:
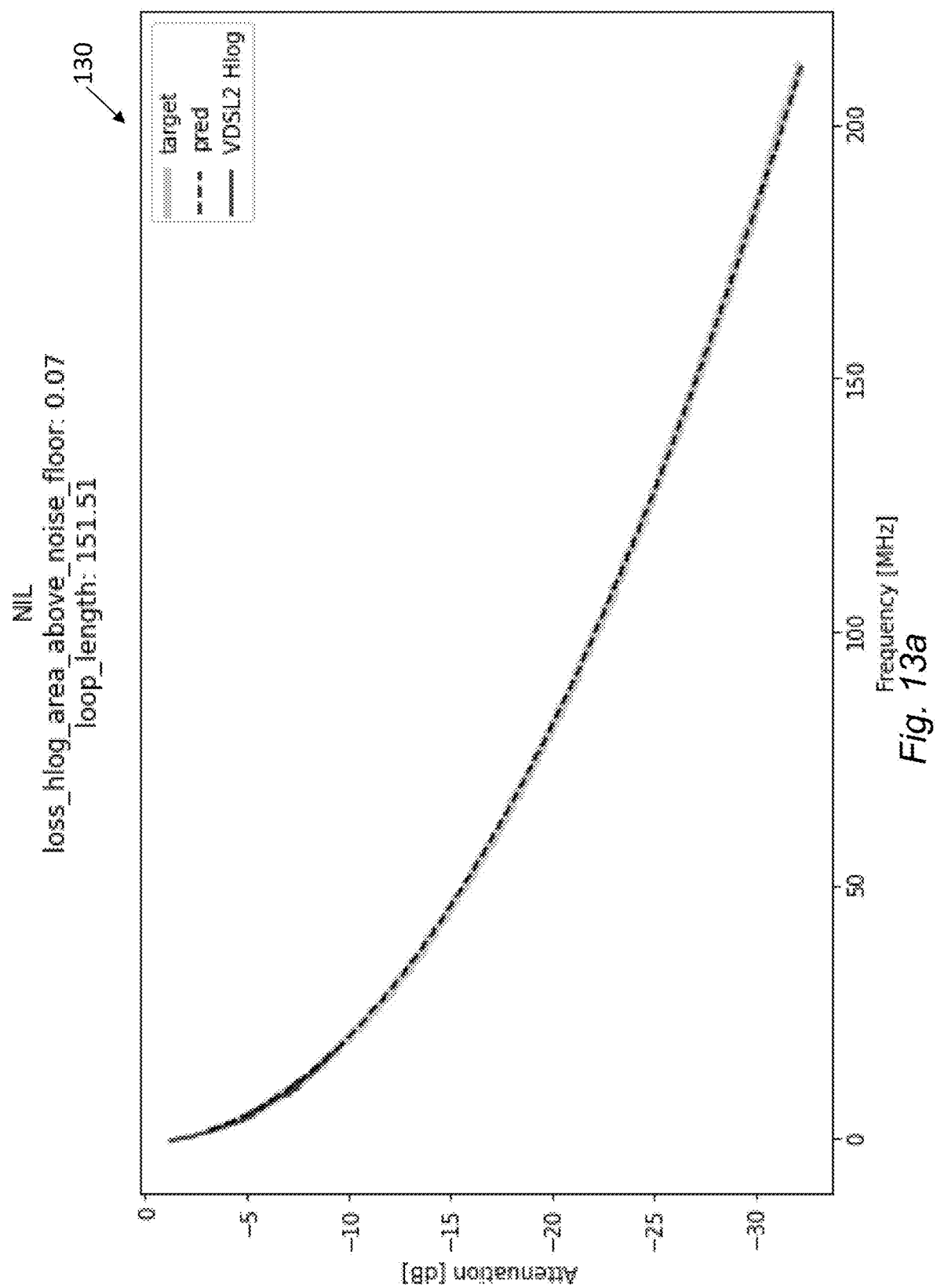
FIG. 13a is a plot showing outputs of example embodiments.
Figure 13B:
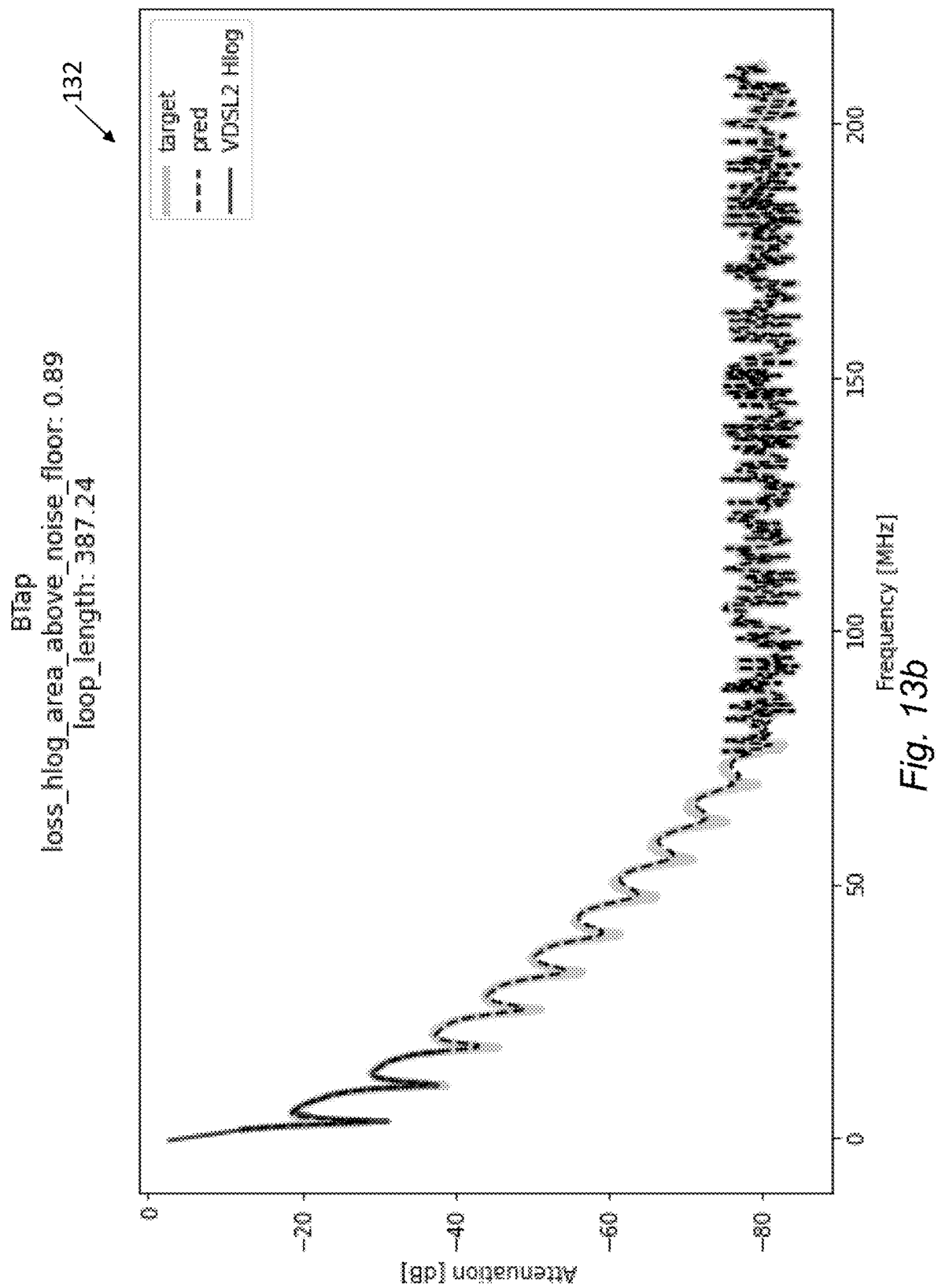
FIG. 13b is another plot showing outputs of example embodiments.
Figure 13C:
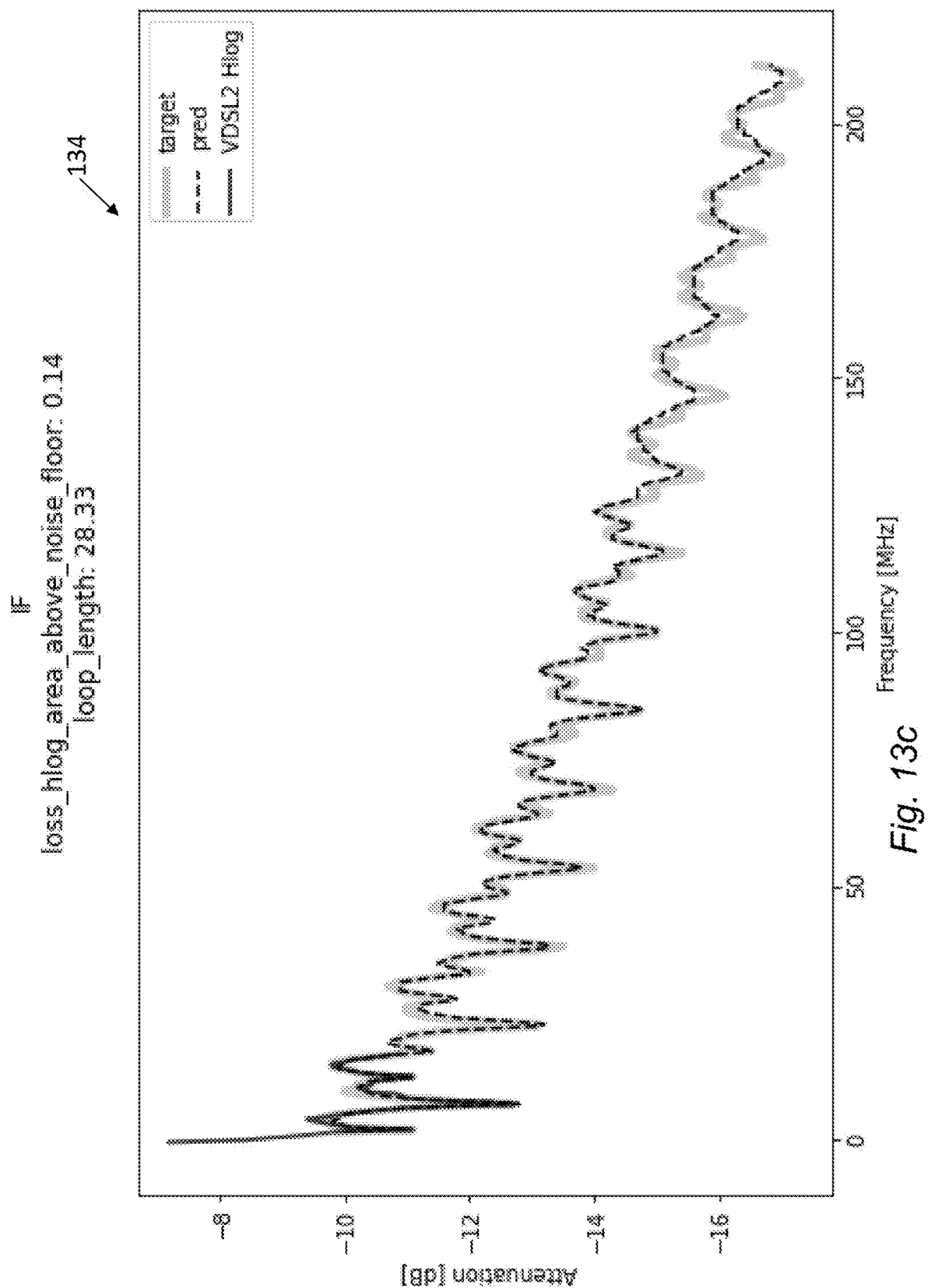
FIG. 13c is a further plot showing outputs of example embodiments.
Figure 13D:
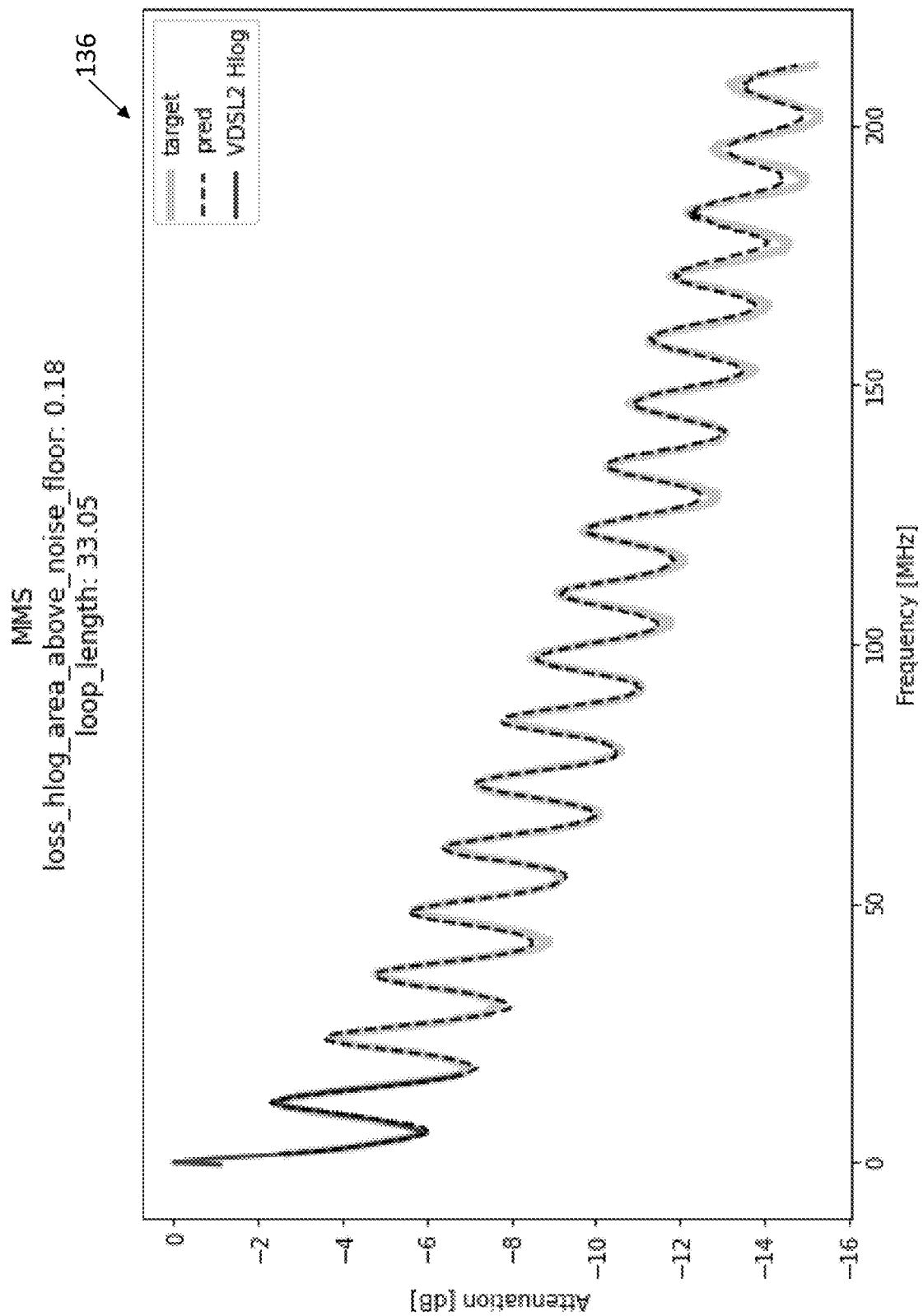
FIG. 13d is yet another plot showing outputs of example embodiments.

In an example, the convolutional encoder-decoder ML model 80 is trained using the hyperparameters found from a genetic optimisation search using a training dataset covering various channel impairments with input channel responses over a first frequency spectrum covering approximately 20 MHz (e.g. 0 MHz to 17 MHz) and target channel responses over a second frequency spectrum covering approximately 220 MHz (e.g. 2.2 MHz-212 MHz). The input and output Hlogs are represented as a 512 element vector with 512 tones, where the $512^{th}$ tone corresponds to 212 MHz. The performance of the resulting trained convolutional encoder-decoder ML model 80 is shown in FIGS. 13*a*-13*d* for various channel configurations and/or impairments. In FIG. 13*a* the plot 130 illustrates a predicted channel response for communication link comprising a loop without any physical impairment (e.g. Non Impaired Loop). In FIG. 13*b*, the plot 132 illustrates a predicted channel response for a communication link comprising a loop having Bridged Tap (BTap) connection on its path. In FIG. 13*c*, the plot 134 illustrates a predicted channel response for a communication link comprising a loop suffering from Insulation weakness (Insulation Fault). In FIG. 13*d*, the plot 136 illustrates a predicted channel response for a communication link comprising a loop composed of several cable segments with different impedance factors (MisMatch Segments).

Given that VDSL2 can operate in serial band plans, the convolutional encoder-decoder model 80 was also trained and tested with input channel responses covering the main three VDSL2 frequency spectrums: 8 MHz, 12 MHz and 17

MHz for predicting/synthesizing a G.fast channel frequency response covering the G.fast spectrum of 212 MHz. The resulting trained convolutional encoder-decoder model is capable of synthesising a G.fast Hlog with a frequency spectrum of 212 MHz based on a VDSL2 Hlog with a frequency spectrum 8 MHz as input. This corresponds to providing less than $\frac{1}{25}^{th}$ of the target spectrum as a base (e.g. 8 MHz) from which to predict the expected channel response of the full spectrum (e.g. 212 MHz).

The methods, system and solution are not limited to a given spectrum or even technology. For example, it has been implemented and validated on DSL input channel responses covering a range of 0-20 MHz (e.g. [f1, f2]=0 MHz-17 MHz frequency spectrum) with G.fast output channel responses covering ranges of 0-220 MHz (e.g. [f1', f2']=2.2 MHz-212 MHz MHz). As another example, for most DSL technologies, the range can be extended to cover the 0 MHz to 8/12/17/35 MHz spectrums for the input channel responses and ranges covering 2.2 MHz to 21/40-106/212/424 MHz spectrums for the output channel responses. Embodiments herein have been used, by way of example only, with reference to the G.(mg)fast context, it is to be appreciated by the skilled person that the methods, systems and ML models as described herein may be applicable to any wired or wireless communication link and any suitable input and output frequency spectrum as the application demands.

Despite the training set contains a finite number of impairments simulated, the present approach is not limited to only those impairments. If others are known and measurements have been obtained of such, the training set can be improved by adding simulations of those new impairments and the ML model could be retrained in order to take them into account.

In real-world communications networks, knowledge in advance of potential channel impairments present and/or affecting the loop or communication link is not typically known, especially when deploying new communication technologies that may operate over the communication link or loop using one or more different frequency spectrums. As such, various types of communication network topologies, various types of channel impairments, various types of channels such as wireless (e.g. cables) or wireless, various types of termination, various types of interconnections, presence of unbalance etc. are expected to be present on a channel of a communication link. A measured channel response of a channel of a communication link therefore may contain information about these and many other properties or impairments of the channel. The methods and systems described herein may be further extended, trained and validated on additional training sets containing all these characteristics. This enables the ML model to be configured and/or trained to accept and process any input channel response data over the input frequency spectrum and, from it, process it to synthesize the corresponding second channel frequency response over a second channel frequency spectrum, where the second channel frequency spectrum is different to the input frequency spectrum.

Figure 14:
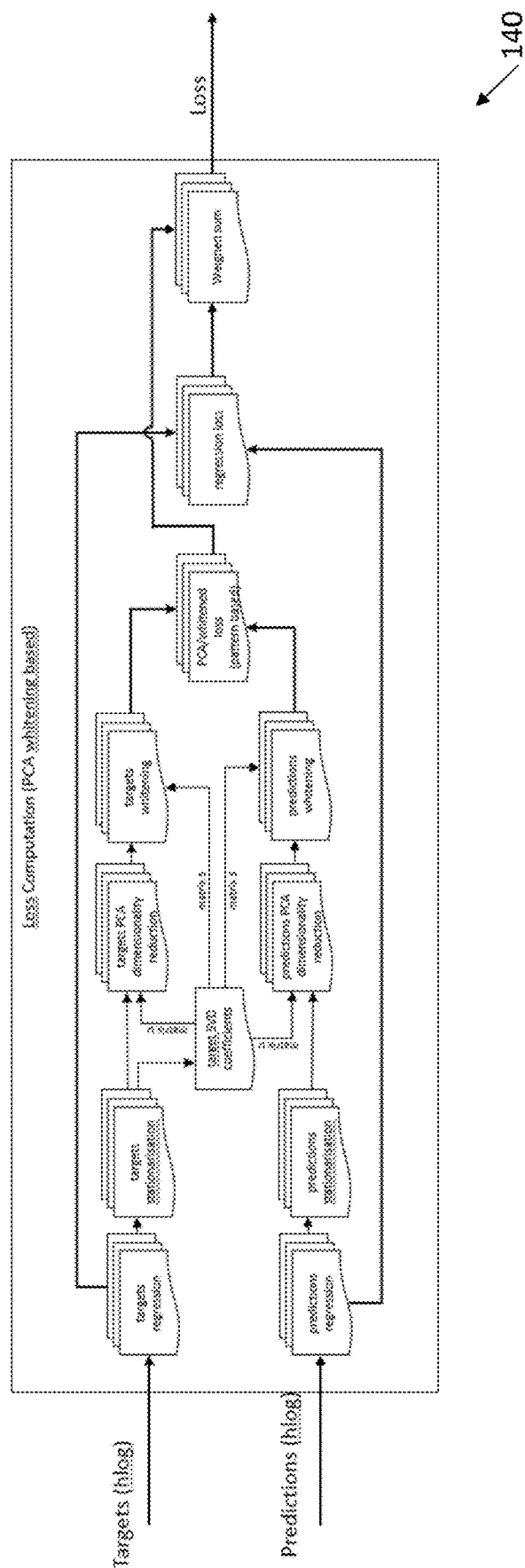
FIG. 14 is a block diagram of a loss computation module in accordance with an example embodiment.

By way of example, FIG. 14 is a block diagram of a loss computation module, indicated generally by the reference numeral 140, in accordance with an example embodiment. The loss computation module 140 is a PCA whitening and regression based loss computation module. The loss computation module 140 or modifications thereof may be used, for example, in apparatus 30, system 50, ML models 60-80, and/or methods/processes 90, 100, 110, and/or for training one or more suitable ML models as described herein, combinations thereof, modifications thereto and/or as the application demands.

The methods and systems described herein may be further extended to take into account loop length of the channel or part thereof in a communication link in relation to the input channel response and/or the synthesized channel frequency response over the desired frequency spectrum. For example, twisted pair copper DSL cables (e.g. VDSL2) are becoming more and more combined with fiber optical cables (e.g. fibre to the neighbourhood node (FTTN)), for instance under the migration scenario from FTTN+VDSL2 to FTTB+G.fast, the methods, apparatus and system may be applied within the constraints of the specified targeted topology. In such context, only a part of the loop (e.g. part of the FTTN+VDSL2 loop or FTTN+G.fast loop) of the communication link might be of use and not anymore the full topology, where shortening for instance its loop length can potentially limit or reduce the impact of some topological elements. For example, shortening the twisted pair copper DSL cable portion of the loop may be required due to severe attenuation at the higher G.fast frequencies, by shortening, the twisted pair copper DSL cable portion of the loop may become feasible at the higher G.fast frequencies when the communication technology changes. Thus, loop shortening, which can affect the input and also output channel frequency responses can be addressed by the ML model based on, without limitation, for example the following methodology.

The system and/or apparatus 30 implementing the ML model may be further modified in which a shortening scalar or loop length scale factor input might advantageously be added as input to the apparatus 30 for adjusting the input channel response data to the shortened loop length. This shortening scaler or loop length scale factor parameter may specify or indicate the location of the shortening or the length of the remaining piece of channel (e.g. copper DSL cable) that remains in the loop. This shortening parameter allows the system, apparatus and methods herein to modify the original input channel response at the original length prior to shortening using the shortening parameter or loop length scale factor to estimate the input channel frequency response due to the shortening, which can be input to the ML model for predicting a synthetized channel frequency response over the second frequency spectrum based on the shortening. From a system & method perspective, the different parts remain similar and further training could be performed with same inputs and targets reflecting such reduced topology.

For example, apparatus 30 may further include processing means configured to adjust the first channel response for estimating the second channel response at a reduced loop length based on: determining a loop length scale factor derived from measuring or simulating multiple channel responses at different loop lengths in relation to the channel and estimating the slopes of each of the multiple channel responses; estimating a first channel response at the reduced loop length based on proportionally scaling the first channel response in relation to the loop length scale factor and the target length of the loop; and applying the estimated first channel response at the reduced loop length to the ML model for outputting a second channel response at the reduced loop length over the second frequency spectrum.

For example, the shortening parameter or loop length scale factor is described in relation to a DSL copper pair. It is to be appreciated by the skilled person that this methodology may be applied to any wired communication link or loop and the like. Due to the "skin effect", a healthy DSL copper pair has a channel frequency response expressed in a logarithmic scale (dB) which presents linear attenuation with respect to the square of the signal frequency, which may be expressed as $Hlog_{[dB]}=a*sqrt(f_{[Hz]})$. For a particular type of cable, for example, a twisted pair cable (e.g. TP100), the Hlog in VDSL2 (or other DSL standard) may be measured and/or simulated for different loop lengths (e.g. from a range of [0, 2] km). The slope of each Hlog (e.g. attenuation vs frequency) for the different loop lengths may be calculated and then "a" parameter may be represented as a linear function of the loop length vs Hlog slope. There is a linear relation between the "a" parameter and the loop length, and by performing a linear regression, for one particular cable type (e.g. TP100), the "a" parameter value can be expressed as a function of the loop length based on: a=a_wire*loop_length, where a_wire is the gradient of the linear relation. Knowing the initial Hlog and knowing the initial and reduced loop length, the cable characteristics (a_wire) or an average of used cable characteristics (a_wire_average), it is possible to estimate the resulting Hlog for the reduced loop length. The loop length scale factor may be the a_wire or a_wire_average. For example, the initial Hlog at the initial loop length may be "scaled" to an initial Hlog at the reduced loop length by decreasing the initial Hlog "slope" proportionally based the scale factor a_wire or a_wire_average over the removed segment length. The "scaled" initial Hlog may then be input to the ML model for estimating a second channel frequency response at a second frequency spectrum for the reduced loop length.

More formally, the initial loop length is not necessarily always known by the operator (or not accurately known), but, in such a case it is still possible to estimate the resulting Hlog for a reduced loop length. The Hlog at the reduced loop length may be represented as: $Hlog\_lr=(Hlog\_lo-OHlog\_lo)+(L\_target*a\_wire*sqrt(f_{[Hz]}))$, where Hlog_lr=Hlog at length reduced, Hlog_lo=Hlog at initial length (initial Hlog measurement), OHlog_lo=Original Hlog for the Hlog at initial length, which can be obtained by fitting a "tangent" to the Hlog using empirical algorithms and/or any other suitable method, and L_target is the target loop length. The Hlog may be "scaled" by decreasing the Hlog "slope" proportionally based on L_target*a_wire to the removed segment length to correctly match the target loop length.

For example, for an ML model (e.g. neural network ML model, transformer-based ML model, Convolutional Encoder/Decoder ML model 60, 70, 80 and the like) trained to receive an input Hlog in the VDSL2 spectrum and output a synthesised or estimated output Hlog in the G.fast spectrum, then from an input Hlog measured at initial loop length in the VDSL2 spectrum, an estimated Hlog at the G.fast spectrum for a reduced loop length can be estimated based on using the above scaling Hlog methodology to estimate the input Hlog at the reduced loop length in the VDSL2 spectrum, and inputting the estimated input Hlog in the VDSL2 spectrum at the reduced loop length to the trained ML model (e.g. neural network ML model, transformer-based ML model, Convolutional Encoder/Decoder ML model 60, 70, 80 and the like), which processes the estimated input Hlog at the reduced loop length to predict and/or synthesize an estimated output Hlog over the G.fast spectrum at the reduced loop length. This methodology may be applied to any suitable ML model and suitable communication link, loop and/or loop length and the like.

Figure 15:
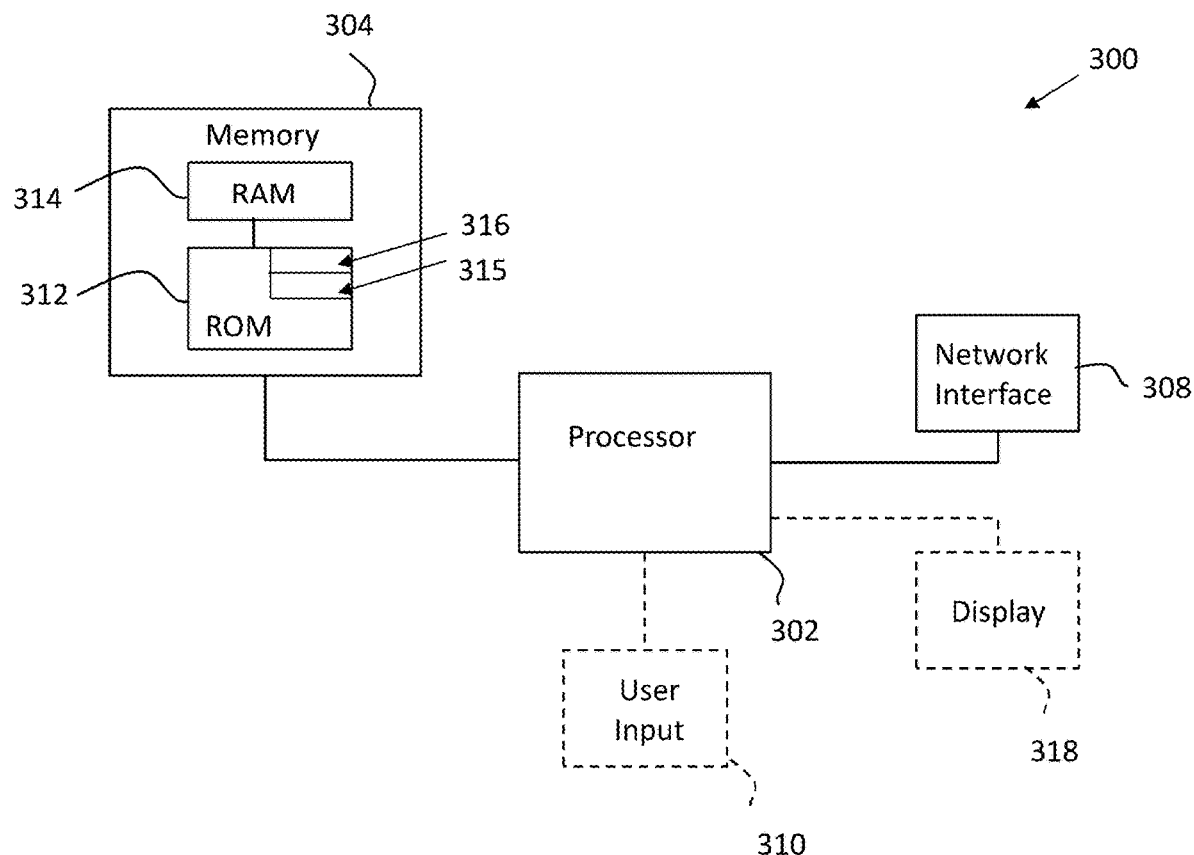
FIG. 15 is a block diagram of components of a system in accordance with an example embodiment.

For completeness, FIG. 15 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a transceiver unit which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and algorithms 50, 70 and 90 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 16:
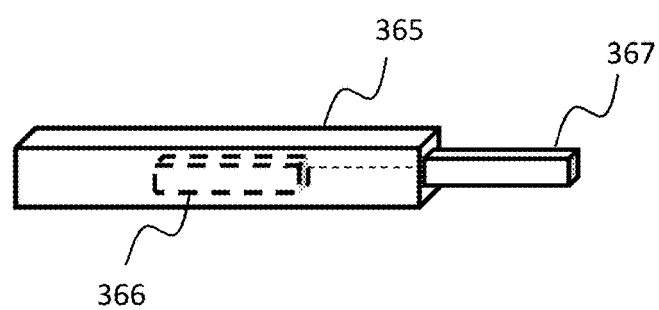
FIG. 16 shows an example of tangible media for storing computer-readable code which when run by a computer may perform methods according to example embodiments described above.

FIG. 16 shows tangible media, specifically a removable memory unit 365, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 5, 9, 10 and 11 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one memory including computer program code;
at least one processor configured to execute the computer program code and cause the the apparatus to perform,
obtaining channel response data comprising a first channel frequency response of a channel over a first frequency spectrum, wherein the first channel frequency response is generated in response to a transmission over the channel or a simulation thereof; and
generating an estimate of a second channel frequency response of the channel over a second frequency spectrum in response to applying the channel response data to a machine-learning, ML, model, wherein the second frequency spectrum is different to the first frequency spectrum.

2. An apparatus as claimed in claim 1, wherein the first frequency spectrum has a frequency range between a first and a second frequency, and the second frequency spectrum has a frequency range between a third and a fourth frequency, the fourth frequency being greater than the second frequency.

3. An apparatus as claimed in claim 1, wherein the first channel response is a narrowband channel response of a narrowband transmission, the second channel response estimate is a wideband channel response.

4. An apparatus as claimed in claim 1, wherein the channel is a communications medium comprising a wired communications medium or, a wireless communications medium, or a combination of both.

5. An apparatus as claimed in claim 1, wherein the ML model comprises any ML model from the group of:
neural network;
transformer-based ML model;
encoder-decoder ML model;
any other ML model capable of being trained to predict a second channel frequency response over a second frequency spectrum in response to applying a first channel frequency response over a first frequency spectrum.

6. An apparatus as claimed in claim 5, wherein the ML model is an encoder-decoder ML model, and the apparatus is further caused to perform:
extracting a channel response feature set in response to applying the channel response data to an encoder of the encoder-decoder ML model; and
generating the estimate of the second channel frequency response of the channel over the second frequency spectrum in response to applying the extracted channel response feature set to a decoder of the encoder-decoder ML model.

7. An apparatus as claimed in claim 6, wherein the encoder of the encoder-decoder ML model comprises a convolutional encoder and the decoder comprises a convolutional decoder, the convolutional encoder further comprising a neural network of one or more convolution layers, one or more pooling layers, and one or more fully-connected layers configured for extracting the channel response feature set, and the convolutional decoder further comprising a neural network of one of more deconvolution layers configured for receiving and transforming data representative of the extracted channel response feature set into an estimated second channel response of the channel over the second frequency spectrum.

8. An apparatus as claimed in claim 1, wherein the apparatus is further caused to perform:
training of the ML model based on,
obtaining training data instances, each training data instance comprising data representative of a channel response and data representative of a target channel response;
applying a training data instance to the ML model;
estimating a loss based on a difference between the estimated second channel frequency response output by the ML model and the target channel frequency response of each training data instance; and
updating a set of weights ML model based on the estimated loss.

9. An apparatus as claimed in claim 8, wherein each training instance comprises at least one from the group of:
channel response data generated in response to a transmission over an example channel or a simulation thereof, and target channel response data generated in response to a target transmission over the example channel or simulation thereof;

channel response data generated in response to a transmission over an example channel or a simulation thereof, target channel response data generated in response to a target transmission over the example channel or simulation thereof, and an indication of the target frequency range or spectrum.

10. An apparatus as claimed in claim 8, wherein a batch of samples of training instance data is applied to the ML model, and the estimating said loss includes:

performing a regression analysis on said estimated second channel frequency responses output samples and corresponding target channel responses is said batch of samples;

stationarising the estimated second channel frequency responses and corresponding target channel response samples of the batch of samples to seek to set each sample in the batch to the same mean;

performing a principal component analysis and whitening process on said stationarised estimated second channel frequency response and corresponding target channel response samples of the batch of samples; and estimating the loss based on a weighted combination of the output of the principal component analysis and whitening process and regression analysis.

11. An apparatus as claimed in claim 1, wherein the apparatus is further caused to perform processing the estimated second channel response based on performing one or more from the group of:

predicting, based on the estimated second channel response, a channel capacity of the channel prior to deployment of communications technologies expected to use said second frequency spectrum on said channel;

estimating, based on the estimated second channel response, Signal-to-Noise ratio, SNR, for operating frequencies of said second frequency associated with communication technologies expected to operate said channel over said second frequency spectrum; and predicting a set of configuration parameters, based on said estimated second channel response, for provisioning a communication link to maximise a quality of service value when deployed to use said channel over said estimated second frequency spectrum.

12. An apparatus as claimed in claim 1, wherein the apparatus is further caused to perform processing the first channel response for estimating the second channel response at a reduced loop length based on:

determining a loop length scale factor based on measuring or simulating multiple channel responses at different loop lengths in relation to the channel and estimating the slopes of each of the multiple channel responses;

estimating a first channel response at the reduced loop length based on proportionally scaling the first channel response in relation to the loop length scale factor and the target length of the loop; and applying the estimated first channel response at the reduced loop length to the ML model for outputting a second channel response at the reduced loop length over the second frequency spectrum.

13. A method comprising:

obtaining channel response data comprising a first channel frequency response of a channel over a first frequency spectrum, wherein the first channel frequency response is generated in response to a transmission over the channel or a simulation thereof; and generating an estimate of a second channel frequency response of the channel over a second frequency spectrum in response to applying the channel response data to a machine-learning, ML, model, wherein the second frequency spectrum is different to the first frequency spectrum.

14. A non-transitory computer readable medium storing instructions, which when executed by a processor included in an apparatus, cause the apparatus to perform at least the following:

obtaining channel response data comprising a first channel frequency response of a channel over a first frequency spectrum, wherein the first channel frequency response is generated in response to a transmission over the channel or a simulation thereof; and generating an estimate of a second channel frequency response of the channel over a second frequency spectrum in response to applying the channel response data to a machine-learning, ML, model, wherein the second frequency spectrum is different to the first frequency spectrum.

* * * * *